US011200540B2

(12) United States Patent
McCally et al.

(10) Patent No.: US 11,200,540 B2
(45) Date of Patent: Dec. 14, 2021

(54) FABRICATION, DISTRIBUTION, AND INTEGRATED ORDER PROCESSING SYSTEM

(71) Applicant: The Brandt Companies, LLC, Carrollton, TX (US)

(72) Inventors: Bobby McCally, Carrollton, TX (US); Robert Everett, Carrollton, TX (US); Kyle Holmes, Carrollton, TX (US)

(73) Assignee: THE BRANDT COMPANIES, LLC, Carrollton, TX (US)

(*) Notice: Subject to any disclaimer, the term of this patent is extended or adjusted under 35 U.S.C. 154(b) by 540 days.

(21) Appl. No.: 15/984,981

(22) Filed: May 21, 2018

(65) Prior Publication Data
US 2019/0095865 A1   Mar. 28, 2019

Related U.S. Application Data

(60) Provisional application No. 62/562,265, filed on Sep. 22, 2017.

(51) Int. Cl.
*G06Q 10/10* (2012.01)
*G06Q 10/06* (2012.01)
(Continued)

(52) U.S. Cl.
CPC ............ *G06Q 10/103* (2013.01); *G06F 8/34* (2013.01); *G06F 30/00* (2020.01); *G06F 30/13* (2020.01);
(Continued)

(58) Field of Classification Search
CPC .... G06Q 10/103; G06Q 10/10; G06Q 50/163; G06Q 10/06313; G06Q 30/0635;
(Continued)

(56) References Cited

U.S. PATENT DOCUMENTS 10,127,507 B2 * 11/2018 Lavrov ............ G06Q 10/06313
2002/0072986 A1 * 6/2002 Aram ................. G06Q 30/0635
705/7.36
(Continued)

OTHER PUBLICATIONS

J. Hou, C. Su, L. Zhu and W. Wang, "Integration of the CAD/PDM/ERP System Based on Collaborative Design," 2008 ISECS International Colloquium on Computing, Communication, Control, and Management, 2008, pp. 561-566, doi: 10.1109/CCCM.2008.339. (Year: 2008).*
(Continued)

*Primary Examiner* — Crystol Stewart
(74) *Attorney, Agent, or Firm* — Jackson Walker LLP; Christopher J. Rourk

(57) ABSTRACT

An order workflow system integrated with a fabrication/distribution system for managing workflow order. The system can receive a selection of a job number and a work order number and generate selectable line items based on the work order number. Selected line items associated with the work order type can be processed and an order workflow can be generated at an order queue process. The selected line items can be interfaced with a BIM database to identify the selected line items, at a spooling sub-queue process, and generate a control number for each line item. The line items can then be interfaced with an ERP module. Inventory data items can be generated from the selected line items and the inventory data items interfaced with an inventory API of the ERP module. The order workflow can be further processed in a similar queued and integrated manner with a fabrication/distribution system.

20 Claims, 28 Drawing Sheets

(51) Int. Cl.
*G06Q 30/06* (2012.01)
*G06Q 10/08* (2012.01)
*G06F 30/13* (2020.01)
*G06F 30/00* (2020.01)
*G06K 9/00* (2006.01)
*G06F 8/34* (2018.01)
*G06Q 50/16* (2012.01)
*G06F 113/14* (2020.01)

(52) U.S. Cl.
CPC ..... *G06K 9/00624* (2013.01); *G06K 9/00671* (2013.01); *G06Q 10/06313* (2013.01); *G06Q 10/06316* (2013.01); *G06Q 10/087* (2013.01); *G06Q 10/10* (2013.01); *G06Q 30/0635* (2013.01); *G06Q 50/163* (2013.01); *G06F 2113/14* (2020.01)

(58) Field of Classification Search
CPC ............ G06Q 10/087; G06Q 10/06316; G06F 30/00; G06F 30/13; G06F 2113/14; G06F 8/34; G06K 9/00671; G06K 9/00624
See application file for complete search history.

(56) References Cited

U.S. PATENT DOCUMENTS

| | | | | |
|---|---|---|---|---|
| 2002/0107813 A1* | 8/2002 | Kanatani | ................ | G06Q 30/06 705/64 |
| 2003/0125826 A1* | 7/2003 | Holman | ................ | G06F 30/00 700/97 |
| 2004/0064351 A1 | 4/2004 | Mikurak | | |
| 2004/0111173 A1* | 6/2004 | Grabenstetter | ........ | G06Q 10/06 700/100 |
| 2005/0288808 A1* | 12/2005 | Lopez | ................ | G06Q 10/087 700/97 |
| 2006/0059253 A1* | 3/2006 | Goodman | ............. | G06Q 10/06 709/223 |
| 2006/0075035 A1* | 4/2006 | Tripp | ................... | G06Q 10/107 709/206 |
| 2010/0205032 A1* | 8/2010 | Nielsen | ................ | G06Q 10/063 705/7.11 |
| 2011/0307281 A1* | 12/2011 | Creveling | ............ | G06Q 10/063 705/7.11 |
| 2012/0065944 A1* | 3/2012 | Nielsen | ................ | G06Q 10/103 703/1 |
| 2013/0338972 A1* | 12/2013 | Chao | ................. | G06Q 10/0637 703/1 |
| 2013/0339078 A1* | 12/2013 | Harris | ............. | G06Q 10/06313 705/7.23 |
| 2014/0032255 A1* | 1/2014 | Hegazi | ............ | G06Q 10/06313 705/7.22 |
| 2015/0248504 A1* | 9/2015 | Glunz | ..................... | G06F 30/13 700/98 |
| 2016/0335731 A1* | 11/2016 | Hall | ..................... | G06Q 10/067 |
| 2017/0180372 A1* | 6/2017 | Bezold | ................. | G06Q 10/06 |
| 2017/0213395 A1* | 7/2017 | Yu | ......................... | G06F 9/5027 |
| 2018/0276319 A1* | 9/2018 | Tierney | .................. | G06F 30/13 |
| 2018/0299843 A1* | 10/2018 | Ray | ...................... | G06Q 10/063 |
| 2018/0341249 A1* | 11/2018 | Abuelsaad | ............ | G06Q 10/00 |
| 2019/0156443 A1* | 5/2019 | Hall | ...................... | G06Q 10/10 |
| 2019/0347751 A1* | 11/2019 | Gupta | ................. | G06Q 10/103 |
| 2021/0264369 A1* | 8/2021 | Zass | ........................ | G06F 3/167 |

OTHER PUBLICATIONS

Notification of Transmittal of the International Search Report and Written Opinion of the International Searching Authority—Russia—for International Application No. PCT/US2018/048461, dated Dec. 20, 2018, 7 pages.

* cited by examiner

FIG. 4A

Home Page | BOWS PROD | Charles Fisher

Lists
- Sheet Metal WorkOrders
- PPG WorkOrders
- Service WorkOrders
- Shop to Shop WorkOrders
- Search Control Number

Add New WorkOrder Wizard

General information related to the work order must initially be entered.

1 - General

Who is making this work request?
- ● Requested By Me    ○ I am requesting on behalf of: [Enter login ID]

What job is this work request associated?
[15-D023  ▼] [🔍]

All required cost codes will be auto created

Specify the contract or shop drawing information that will be used as the default when adding line items with specifications (optional)

Shop Drawing Number: [        ] [🔍]   or Contract Drawing Number: [        ]

Enter Area, Order due date and whether the Order is Hot and if it authorized for OT.

Area: [        ] [🔍]   Enter Due On Site [▼] Monday   ☐ Authorized for Overtime

Specify a short descriptive reference name for the order.

[                                                        ]

[Next ⇨]

- Lists
- Shop Time
- Jobs and Projects
- Reports
- Contacts

WorkOrder Line Item - Detail

Description: M1.01 Level 5 Core Area | All Systems ▼

CAM Reqd: Yes ▼

☐ Send Dwgs  ☑ Wrap Ends  ☐ Specialty

Due Date: (?) 6/16/2017 ☐ Friday 🗓

Reason: Ad-Hoc Reason ▼ | DLM Number ▼

Associated Documents:

View ☑ EXAMPLE - CAM E1:00A RELEASE 2.pdf

View ☑ MN1-L400-W2 1-1 MECH. RM.pdf

Tag Color: ☐ White ▼

Special Instructions:

Each system on one line item

☐ Authorized for OT   Is Planned: Yes ▼

[ Cancel ]

WorkOrder Line Item - Detail

Change Specification ...

| Purity | System ID | System | Material | Material |
|---|---|---|---|---|
| NA | SS (NH) | SANITARY | CAST IRON NO-HUB | NO-HUB SW COUPLING |

Description: Level 1 Cast Iron — Sanitary NH Overhead

Field Cost Code for Funds Transfer  Trade: PG  Cost Code: 01-120-071-000

System: 120-Sanitary  Material: 071-NH CI

☐ Authorized for OT  ☐ Is Domestic  ☐ Is Assembly

Spool Reqd: Yes ▼

Spool Reqd Date: 6/9/2017

Due Date: 6/29/2017  Thursday

Reason: Standard Order ▼

Print Number: [  ] 🔍

Shop Dwg Nbr: P1.1 ▼ 🔍

Area: All ▼ 🔍

Weld Detail: ▶

Associated Documents:

No documents attached

Special Instructions:

[ OK ]  [ Cancel ]

| On Hold | Submitted Date | Control Nbr | Due Date | Job Number | Job Name | | WO Description |
|---|---|---|---|---|---|---|---|
| No | 8/10/2015 | 13754101 | 9/8/2015 | 15-00253 | LOCKHEED AFF2 MECHANICAL | CHW RISERS |
| No | 8/11/2015 | 13782101 | 8/28/2015 | 15-00253 | LOCKHEED AFF2 MECHANICAL | CONNEX RACKS |
| No | 9/1/2015 | 13890101 | 9/4/2015 | 15-00253 | LOCKHEED AFF2 MECHANICAL | TEMPORY FABS |
| No | 9/1/2015 | 13893100 | 9/10/2015 | 15-00253 | LOCKHEED AFF2 MECHANICAL | FAX 1 |
| No | 9/1/2015 | 13893101 | 9/10/2015 | 15-00253 | LOCKHEED AFF2 MECHANICAL | FAX 2 |
| No | 9/2/2015 | 13900101 | 9/17/2015 | 15-00253 | LOCKHEED AFF2 MECHANICAL | FAX-2 |

FROM FIG. 17A

Work Order Line Item Detail

Control Number: 13985107 DA-SM Job: 13-00649 HB GONZALES CONV. CTR. WORKS PKG
Description: M250 - RFP # 8 DUCT WORK  Due OnSite: — mpsa3 wrap rfp-08 r1  Reason: Standard Order
Robert Rios  Submitted: 9/23/2015  Detailing Due: 10/7/2015  Tag Color: Cyan  Fab Opp #:
Contract Drawing:   Shop Drawing: M250  Area:   CAM Reqd: ☑  Cam Due: 9/23/2015  Completes System:
Supply Air   Variable Volume | Entire Subsystem Service Entire Su Galvanized   3wg SD  Wrap 2" Foil   None Status | *Shipping Instructions | Documents | *Other Instructions | Material | Ancillaries | Connectors | Bought Outs | Costing | Distribution | Audit Log Total Cost: 192.80 Adjusted Total Cost:   Transaction Date: *Enter date*   Transaction ID:

Drag a column header and drop it here to group by that column

| Inventory ID | Quantity | UOM | Extended Current Cost | Qty Available | Qty Allocated | Qty OnHand | Qty OnOrder | Next Expect |
|---|---|---|---|---|---|---|---|---|
| CG20 | 40.25 | LB | 16.48 | 22,268.43 | 37,187.83 | 59,456.26 | 10,000.00 | 10/02/2015 |
| CG24 | 269.4 | LB | 117.05 | 1,925.04 | 43,561.61 | 45,486.65 | 10,000.00 | 10/02/2015 |
| CG24S587 | 73.62 | LB | 33.46 | 10,977.16 | 12,139.42 | 23,116.58 | 0.00 | |
| SHOPMISC | 383.27 | LB | 15.33 | -1,368,982.10 | 58,556.99 | -1,310,425.11 | 0.00 | |
| TDCC | 56 | EA | 10.08 | -34,730.00 | 16,100.00 | -18,630.00 | 0.00 | |
| TDCS0C6 | 4 | EA | 0.40 | 4,944.00 | 129.00 | 5,073.00 | | |

FIG. 21

Work Order LineItem Detail

| Control Number: | 17727101 | SA-P/P | Job: 15-00157 | METH CENTRAL TOWER PJCT #4 |
|---|---|---|---|---|
| Description: | P2.L2-B PLUMBING | | - DOMESTIC WATER | Reason: Standard Order |
| Matthew Harman | Submitted: 12/12/2016 | Due OnSite: 2/23/2017 | Spool Sheets Due: 2/2/2017 | Fab Opp #: |
| Contract Drawing: P2.L2-B | Shop Drawing: P2.L2-B | Area: SL2 - area B | Spooling Required: ✓ |
| DOMESTIC WATER | COPPER | DW | 01-125-051-120 | |

Status | Documents | Other Instructions | Material | Costing | Joint Info | *Shipping Instructions | Distribution | Field PO | Audit Log | Budget

Material | Labor

| ProductCatalogId | Product Code | Product Description | Original Spooled Qty | Provisioned |
|---|---|---|---|---|
| 721 | B-721 | 1/2" NL CC400 W/STOP PXP PROPRESS COP CPL | 6.00 | 6.00 |
| 722 | B-722 | 3/4" NL CC400 W/STOP PXP PROPRESS COP CPL | 2.00 | 2.00 |
| 725 | B-725 | 1/2 VIEGA PXP COP P/PRS 90 ELL | 43.00 | 43.00 |
| 726 | B-726 | 3/4" CE200 PXP COP CLOSE RGH P/PRS 90 ELL | 20.00 | 20.00 |
| 748 | B-748 | 1-1/4X1" NL CR510 FTGXP EPDM P/PRS COP RED | 5.00 | 5.00 |
| 752 | B-752 | 1/2" NL CT300 PXPXP EPDM PROPRESS COP TEE | 3.00 | 3.00 |
| 754 | B-754 | 3/4X1/2X1/2" NL CT300 PXPXP EPDM PROPRESS COP TEE | 2.00 | 2.00 |
| 778 | B-778 | 1/2X1/2 NPT" BA130 FTGXFPT BRZ PROPRESS ADAPTER | 5.00 | 5.00 |
| 783 | B-783 | 1" NL CT300 PXPXP EPDM PROPRESS COP TEE | 1.00 | 1.00 |
| 813 | B-813 | 1" NL CC400 W/STOP PXP PROPRESS COP CPL | 2.00 | 2.00 |
| 814 | B-814 | 2" NL CC400 W/STOP PXP PROPRESS COP CPL | 2.00 | 2.00 |
| 815 | B-815 | 1" CE200 PXP COP CLOSE RGH P/PRS 90 ELL | 9.00 | 9.00 |
| 816 | B-816 | 1-1/4" CE200 PXP COP CLOSE RGH P/PRS 90 ELL | 10.00 | 10.00 |

FIG. 22

Work Order LineItem Detail

| Control Number: | 17727101 | SA-P/P | Job: | 15-00157 | METH CENTRAL TOWER PJCT #4 |
|---|---|---|---|---|---|
| Description: | P2.L2-B PLUMBING | | | - DOMESTIC WATER | Reason: Standard Order |
| Matthew Harman | Submitted: 12/12/2016 | Due OnSite: 2/23/2017 | Spool Sheets Due: 2/2/2017 | | Fab Opp #: |
| Contract Drawing: P2.L2-B | | Shop Drawing: P2.L2-B | Area: SL2 - area B | | Spooling Required: ✓ |
| DOMESTIC WATER | | COPPER | DW | 01-125-051-120 | |

Status | Documents | Other Instructions | Material | Costing | Joint Info | *Shipping Instructions | Distribution | Field PO | Audit Log | Budget

Material | Labor

| ProductCatalogId | Product Code | Product Description | Original Spooled Qty | Provisioned |
|---|---|---|---|---|
| 721 | B-721 | 1/2" NL CC400 W/STOP PXP PROPRESS COP CPL | 6.00 | 6.00 |
| 722 | B-722 | 3/4" NL CC400 W/STOP PXP PROPRESS COP CPL | 2.00 | 2.00 |
| 725 | B-725 | 1/2 VIEGA PXP COP P/PRS 90 ELL | 43.00 | 43.00 |
| 726 | B-726 | 3/4" CE200 PXP COP CLOSE RGH P/PRS 90 ELL | 20.00 | 20.00 |
| 748 | B-748 | 1-1/4X1" NL CR510 FTGXP EPDM P/PRS COP RED | 5.00 | 5.00 |
| 752 | B-752 | 1/2" NL CT300 PXPXP EPDM PROPRESS COP TEE | 3.00 | 3.00 |
| 754 | B-754 | 3/4X1/2X1/2" NL CT300 PXPXP EPDM PROPRESS COP TEE | 2.00 | 2.00 |
| 778 | B-778 | 1/2X1/2 NPT" BA130 FTGXFPT BRZ PROPRESS ADAPTER | 5.00 | 5.00 |
| 783 | B-783 | 1" NL CT300 PXPXP EPDM PROPRESS COP TEE | 1.00 | 1.00 |
| 813 | B-813 | 1" NL CC400 W/STOP PXP PROPRESS COP CPL | 2.00 | 2.00 |
| 814 | B-814 | 2" NL CC400 W/STOP PXP PROPRESS COP CPL | 2.00 | 2.00 |
| 815 | B-815 | 1" CE200 PXP COP CLOSE RGH P/PRS 90 ELL | 9.00 | 9.00 |
| 816 | B-816 | 1-1/4" CE200 PXP COP CLOSE RGH P/PRS 90 ELL | 10.00 | 10.00 |

FIG. 23

Work Order Line Item Detail

| Field | Value | Field | Value |
|---|---|---|---|
| Control Number: | 13985107 | DA-SM | Job: 13-00649 · HB GONZALES CONV.CTR.WORKS PKG |
| Description: | M250 - RFP # 8 DUCT WORK | | mpsq3 wrap rfp-08 r1 |
| Robert Rios | Submitted: 9/23/2015 | Due OnSite: 10/7/2015 | Detailing Due: 9/24/2015 · Reason: Standard Order |
| Contract Drawing: | | Shop Drawing: M250 · Area: | CAM Reqd: ✓ · Cam Due: 9/23/2015 · Tag Color: Cyan |
| Supply Air | Variable Volume | Entire Subsystem Service Entire Su Galvanized | 3wg SD · Wrap 2" Foil · None | Completes System: · Fab Opp #: |

Tabs: Status | *Shipping Instructions | Documents | *Other Instructions | Material | Ancillaries | Connectors | Bought Outs | Costing | Distribution | Audit Log Sub-tabs: Material | Labor

Total Payroll Hours: 0.49 · ST: 0.17 · OT: 0.32 · Last Billed Date:
Total Burdened Labor Charges Submitted to PayRoll: $ 22.93 · Total Burdened Labor Charges UnSubmitted to PayRoll: $ 0

| Date | Shift | PayType | | Total Time |
|---|---|---|---|---|
| ∨ CANNIZZARO, CHRISTOPHER 00:10:00 | | | | |
| 10/02/2015 | 1 | 10 | | 00:04 |
| 10/02/2015 | 1 | 15 | | 00:06 |
| ∨ FRANCIS, BRYAN 00:19:00 | | | | |
| 09/24/2015 | 1 | 10 | | 00:06 |
| 09/24/2015 | 1 | 15 | | 00:13 |
| | | | | 00:29 |

FABRICATION, DISTRIBUTION, AND INTEGRATED ORDER PROCESSING SYSTEM

CROSS REFERENCE TO RELATED APPLICATION

This application claims priority to U.S. Provisional Patent Application No. 62/562,265, filed Sep. 22, 2017, entitled "System and Method for Managing Workflow Orders," the entire contents of which are hereby fully incorporated herein by reference for all purposes.

TECHNICAL FIELD

The present disclosure relates generally to fabrication and distribution systems and, more specifically, with fabrication and distribution systems and order processing systems integrated therewith.

BACKGROUND

Fabrication and distribution facilities for fabricating, distributing, and installing fabricated systems (e.g. metal fabrication for a heating, ventilation, and air conditioning (HVAC) systems; piping fabrication for a drainage system; electrical fabrication; or any relevant skilled trade work, such as fire systems, irrigation systems, assembly work, etc.) used in construction projects are often performed by skilled tradesman and are often performed in an ad-hoc fashion. Meaning, the actual fabrication process is performed without an overseer or, rather, a centralized overseer that can coordinate fabrication and distribution of processes and systems for a construction project. Although the traditional practice may be acceptable under limited circumstance where small scale fabrication can be performed in an effective manner without such oversight, it is often the case that construction projects are of a scale that may require such oversight. This lack of centralized management and oversight can affect the quality of the product fabricated, the time in which the product can be fabricated, and the cost of the fabrication. As such, there is a need for controls and processes that can better manage fabrication and distribution of fabricated systems used in construction and other industrial projects.

SUMMARY

In a first aspect, the present disclosure is directed to a fabrication, distribution, and integrated work order processing system comprising a computer-usable non-transitory storage resource and a processor communicatively coupled to the storage resource, wherein the processor executes application code instructions stored in the storage resource. The executed application codes cause the system to receive a selection of a job number, work order number, and a delivery date; generate selectable line items based on the work order number; process selected line items associated with the work order type and generate, in response, an order workflow, at an order queue process; interface with a building information modeling/management (BIM) database to identify the selected line items, at a spooling sub-queue process and generate, in response, a control number for each line item; and interface information associated with selected line items with an Enterprise Resource Planning (ERP) module.

The system can also generate inventory data items from the selectable line items, at the spooling sub-process queue; and interface the inventory data items associated with the line items with an inventory application protocol interface of the ERP module.

The system can also determine a fabrication facility system according to work order number, at a routing sub-process queue. The system can further generate purchasing data items from the selectable line items, at the routing sub-process queue; and interface purchasing information associated with line items with a purchasing application protocol interface of the ERP module. The system can also create a schedule for the order workflow based on the delivery date, at a scheduling sub-process queue; determine at least one address associated with a fabrication unit according to the job number; and route the order workflow to the address. The system can further receive at least one beginning time entry and an ending time entry for work spent on a fabrication process, at the fabrication sub-process queue; estimate cost of the fabrication process associated with the order workflow, based at least in part on amount of time spent on the fabrication process; and interface the estimated cost of the fabrication process to a job cost application protocol interface of the ERP module.

The system can further generate a status report of an order workflow; determine a plurality of recipient email addresses based on job number; and route status report to the plurality of recipients.

In a second aspect, the present disclosure is directed to a method of integrating an order workflow system with a fabrication and distribution system for managing workflow order data. The method comprising receiving a selection of a job number, work order number, and a delivery date; generating selectable line items based on the work order number; processing selected line items associated with the work order type and generate, in response, an order workflow, at an order queue process; interfacing with a BIM database to identify the selected line items, at a spooling sub-queue process and generate, in response, a control number for each line item; and interfacing information associated with selected line items with an ERP module.

The method further comprising generating inventory data items from the selectable line items, at the spooling sub-process queue; and interfacing the inventory data items associated with the line items with an inventory application protocol interface of the ERP module.

The method further comprising determining a fabrication facility system according to work order type, at a routing sub-process queue; generating purchasing data items from the selectable line items, at the routing sub-process queue; and interfacing purchasing information associated with line items with a purchasing application protocol interface of the ERP module.

The method further comprising creating a schedule for the order workflow based on the delivery date, at a scheduling sub-process queue; determining at least one address associated with a fabrication unit according to the job number; routing the order workflow to the address; receiving at least one beginning time entry and an ending time entry for work spent on a fabrication process, at the fabrication sub-process queue; estimating cost of the fabrication process associated with the order workflow based at least in part on amount of time spent on a fabrication process; and interfacing the estimated cost of the fabrication process to a job cost application protocol interface of the ERP module.

BRIEF DESCRIPTION OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIGS. 4A-4C are illustrations of various User Interfaces (UIs) for creating work orders, according to certain example embodiments;

FIGS. 16-26 are illustrations of various User Interfaces (UI) for displaying, accessing, and controlling the data structure of FIG. 15.

DETAILED DESCRIPTION

Figure 1:
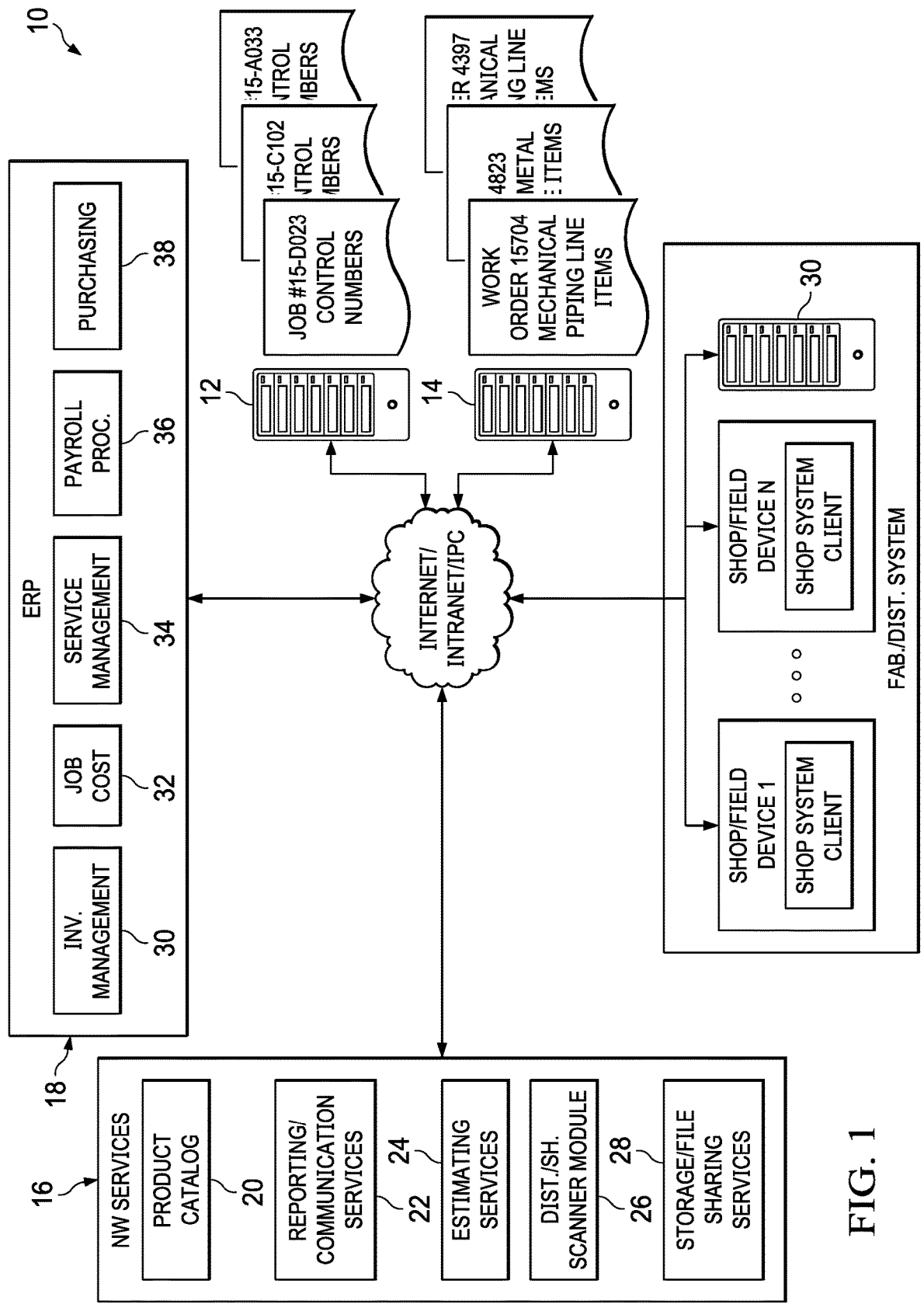
FIG. 1 is a block diagram of fabrication/distribution system and an integrated order processing system for processing orders used to manage fabrication and distribution of component parts for use in construction or industrial projects, according to certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

The accurate use of construction material and labor cost management in a construction project is essential to contractors operating a construction business. Indeed, accurately tracking, or more importantly forecasting, costs are paramount for any contractor. Labor costs can be an enormous business risk for a contractor. If these costs can be managed with a large degree of accuracy, the contractor stands a very good chance of efficiently executing the work and, therefore, maximizing profit margins.

The workflow system, commercially referred to as the Brandt® Order Workflow System (BOWS), integrated with fabrication, distribution, and installation systems provides for defining tasks of work (work order or service calls), as a vehicle to track all aspects of the effort to complete the task—from the estimate to commissioning and final billing. The workflow system can track costs of material inventory, material procurement, BIM (spooling or CAM) labor costs, prefabrication costs, delivery costs, logistics planning, demand and capacity load balancing, field handling and installation costs. By tracking these work order or service call costs, the system provides near real-time feedback of labor efficiencies based on work order task quantity completion. The system provides the tracked electronic time to ERP (Enterprise Resource Planning—accounting oriented) for quick processing of weekly payroll and provides tracking of inventory transfers and purchase orders.

Considering all the components involved, from estimating the various systems and materials on a construction drawing to a completed installation, there can be hundreds of thousands of pieces that must come together from multiple sources. The system is an automated process of work flow management which touches all areas of a company, such as a contractor or subcontractor, with a holistic focus toward BIM, estimating, and ERP round trip process model. It automates existing data while communicating between all Brandt® programs (Autodesk®, Microsoft® DynamicsGP & Key2Act Signature, Fast Est®, Fabrication Suite®, Navisworks®, and BTime) leveraging seamless communication between all the systems. One of the unique aspects of the workflow system taught herein is that it allows users to touch any aspect of the work order process, e.g. to accurately record time associated with the operations of an order to fabricate, distribute, and install a system component. This provides for accurate near real-time earned production efficiencies.

The workflow system assists with all aspects of a work order. A work order can be any order placed with one of many fabrication shops or even a task of work to be installed on a job. It turns the complexity of typical communications into a seamless standardized interface of communication both internally and externally. The system is an automated process of work flow management which touches various areas with a holistic focus toward BIM, estimating, and ERP round-trip process model. Simply put, the system is where work flow is managed.

FIG. 1 is an illustration of a fabrication/distribution system and an integrated order processing system for processing orders used to manage fabrication and distribution of component parts for use in construction projects, according to certain example embodiments, denoted generally as 10. The system 10 comprises an order workflow system 12, an order management system 14, order workflow network services 16, shop/field client devices 1-N, and an Enterprise Resource Planning (ERP) system 18. The system 10 is functional to process job numbers, work order numbers, and line item numbers for a construction related work orders. The system is further functional to integrate fabrication and distribution system related data with the ERP system 18 and ERP system related data with the fabrication and distribution system. The structure of the work order data allows for the facilitation and improvement in the fabrication and distribution of materials used in construction projects by more effectively monitoring and managing the auditing, accounting, and reporting of material consumption and deficiencies, purchasing, packaging, shipping, and estimated and real costs.

The order workflow system 12 includes a work order data interface for receiving and processing work orders from the order management system 14. The work order data received from the order management system 14 includes pre-defined, formatted data structures identifying job number and a plurality of control numbers associated with the job number. Each control number comprises a line item number combined with a job number. The control number can identify at least one inventory item, an associated process control, or data metric used in a particular fabrication or distribution process. The line item number can be associated with many different types of process values as will become more apparent as discussion of the system continues.

The pre-defined, formatted data structures provides for unification of different data structures from different 3$^{rd}$ party applications into a standardized or otherwise common format for integration with a fabrication and distribution system that can be used to enhance fabrication and distribution of products used in construction projects. The system 10 can process and translate data communications to and from fabrication and distribution systems and 3$^{rd}$ party applications, such as the aforementioned Brandt® programs. The system 10 can further generate new data items that can be communicated with the 3$^{rd}$ party applications. The system can further automatically correlate 3$^{rd}$ party application data items with data items generated from the fabrication and distribution system. The data items in question will become more apparent as discussion of the system 10 progresses.

The order management system 14 includes a Building Information Management (BIM) interface module for receiving, processing, and generating line items and associated control numbers based on a job work order number associated with a particular job number. For example, a job associated with a plumbing and piping fabrication process can result in the generation of a specific job number, at least one work order number, and a line item associated with each work order number. The order management system 14 can receive a job number and generate job work order numbers and line items based on items from a BIM database, an ERP system, and user input. It should be understood that the line items can be associated with the job number and the job work order number or the job number. Furthermore, line items can be associated at a fabrication system level or systems level and distribution system or systems level. The order management system 14 can receive selected line item data and, in response, generate an electronic work order with the necessary pre-defined, formatted data structures identifying the job number and control numbers and send or otherwise interface the work order to the order workflow system 12 for further processing and management.

The network services 16 can include a product catalog module 20, a reporting/communications services module 22, and estimating services module 24, a barcode reader module 26, and a storage/file sharing module 28. The product catalog module 20 includes product identifiers relevant to inventory items used in the fabrication process of a construction project, e.g. raw materials used in an HVAC, plumbing, or electrical construction projects. The reporting/communication services module 22 can include a time reporting interface module and a fabrication/distribution progress reporting module. The services module 22 can be a push service using a Mail Delivery Agent (MDA) services, such as IMAP, or can be a network file sharing services either of which can provide services using a real-time or a time triggered service. The estimating services module 24 can in real-time monitor and estimate fabrication costs based on materials used or estimated to be used, time entry for labor, and shipping/transportation costs and interface the costs with the ERP system 18 and provide cost data to requesting or designated parties. The distribution/shipping barcode reader module can interface with barcode scanners for receiving and processing shipping container identification data and product identification data. The data can be used to manage shipping fleets and inventory control. The storage/file sharing module 28 feature can provide access to stored data relevant to a construction project and/or render the stored data to client devices or a select set of client devices. All data received and processed by network services can, at least in part, be processed and controlled by the order workflow system 12.

The ERP system 18 can include an inventory management module 30, a shipping fleet cost module 32, a service management module 34, a payroll processing module 36, and a purchasing module 38. The ERP modules can interface with various other system components within the system 10 and process, store, and communicate relevant information associated with the module, as will become more apparent as discussion of the system 10 continues. For example, the inventory management module 30 can send, receive, and store inventory related data items that can be interfaced from shop/field devices 1-N, from network services 16, order workflow system 12, order management system 14, and other ERP system components. The inventory management module 30 can send, receive, and store inventory related data items at a general enterprise level and at a job specific level. Job cost module 32 can send, receive, and store job cost related data that can be interfaced from shop/field devices 1-N, from network services 16, order workflow system 12, order management system 14, and other ERP system components. The job cost data can be related to a specific fabrication and distribution process and more granularly to specific functions within the process. Payroll processing module 36 can send, receive, and store payroll related data, such as time entry data entered by various parties involved in the fabrication and distribution process. Purchasing module 30 can also send, receive, and store purchase order data by various parties involved in the fabrication and distribution process.

The shop/field client devices 1-N can be designed and configured to interface with the order workflow system 12 and other system components through a system server 30. The shop/filed client devices 1-N can be configured to send and receive fabrication and distribution messages over a wired or wireless Internet and intranet connection using secure and unsecure communication paths. The fabrication and distribution messages can include routed order data, time reporting data, bar code scanning data, reporting data, purchasing data, and inventory control data.

The fabrication and distribution messages can be structured to include a recipient identifier, e.g. an email address or an application identifier, and unformatted data and/or formatted data structures, such as meta data and associated identifiers, that can be used by an individual or an application to further facilitate and improve the fabrication/distribution process or the order workflow system 12 to process and further cause interaction and processing between other system components within the workflow system 10 to further facilitate and improve the fabrication/distribution process.

The system components of the system 10 can communicate over the Internet, intranet, or through InterProcess Communications (IPC). The communications can be performed over unsecure communication means and/or secure communication means. The client systems and devices 1-N can be computing systems operating in a fabrication/distribution facility as part of the fabrication system or can be wireless mobile devices operating remotely in the field as a part of the fabrication/distribution system. Regardless of which, the client devices 1-N are configured to interface with the server system 30 wherein the client devices 1-N and the system server 30 can generate, send, and receive communications that are authenticated and authorized for services of the system 10 according to the at least one of the client system, the client device, and the user of the device. In addition, the system 10 can be designed and configured to support Single Sign On (SSO) services. In other words, the order workflow system 12 can authenticate and authorize user access to a system service, all system services, or a combination of services based on the user and facilitate the seamless authorization to the service or services throughout a session.

The work orders generated by the order management system 14 can include a job number that identifies a particular fabrication and distribution process, e.g. relating to a mechanical fabrication process such as HVAC fabrication or a piping fabrication process such as a drainage system. Associated with the job number can be a number of work order numbers associated with fabrication, distribution, and services required for project completion. Inventory line items associated with the job work order number can identify materials required to fabricate an item for a construction project and materials needed for packaging and delivery of a fabricated item. Other line items that can be associated with the job or work order number can include, e.g., a project due date, project coordinators/managers, fabrication and distribution process metrics, and other miscellaneous items such as instructions. In an example embodiment, the work order can include a pre-defined, structured identifier identifying a fabrication process and the order management system 14 can identify and link the identifier to a set of BIM database items through the BIM database interface. Items selected from the set can be used along with the structured identifier to generate the work order data for processing and management by the order workflow system 12.

Figure 2:
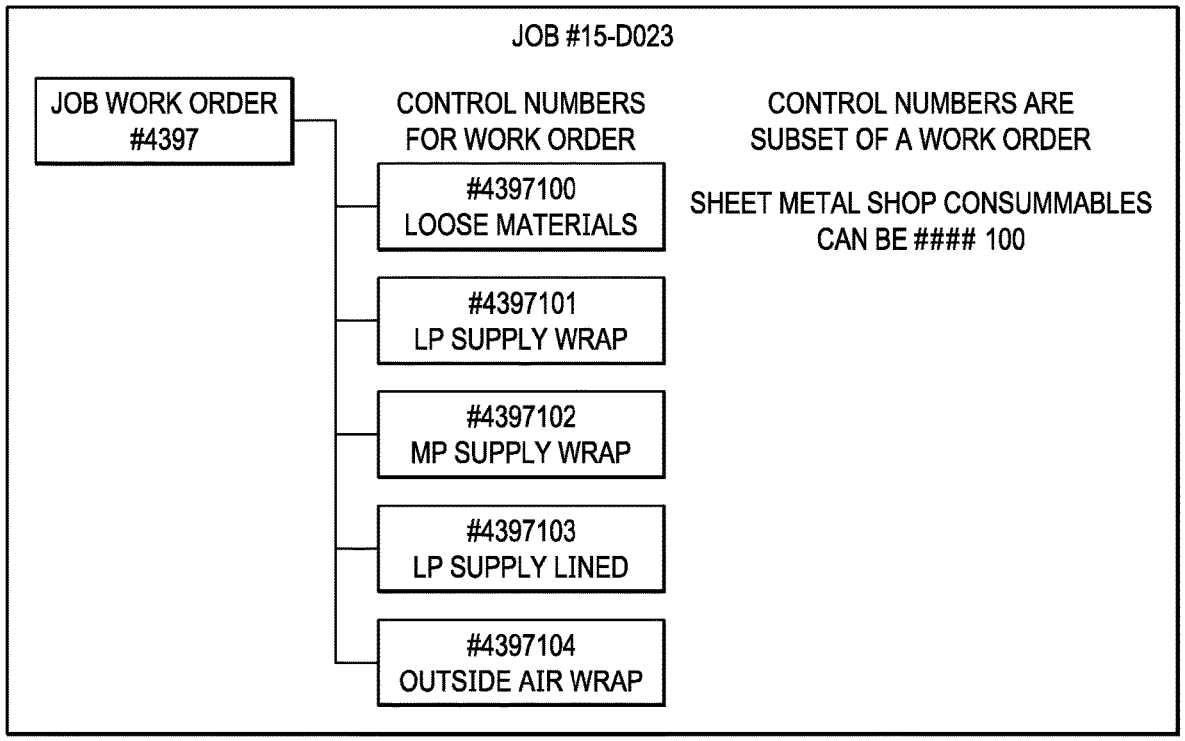
FIG. 2 is an example work order with an assigned job number (or service call), workflow order number, and line items, according to certain example embodiments.
Figure 3:
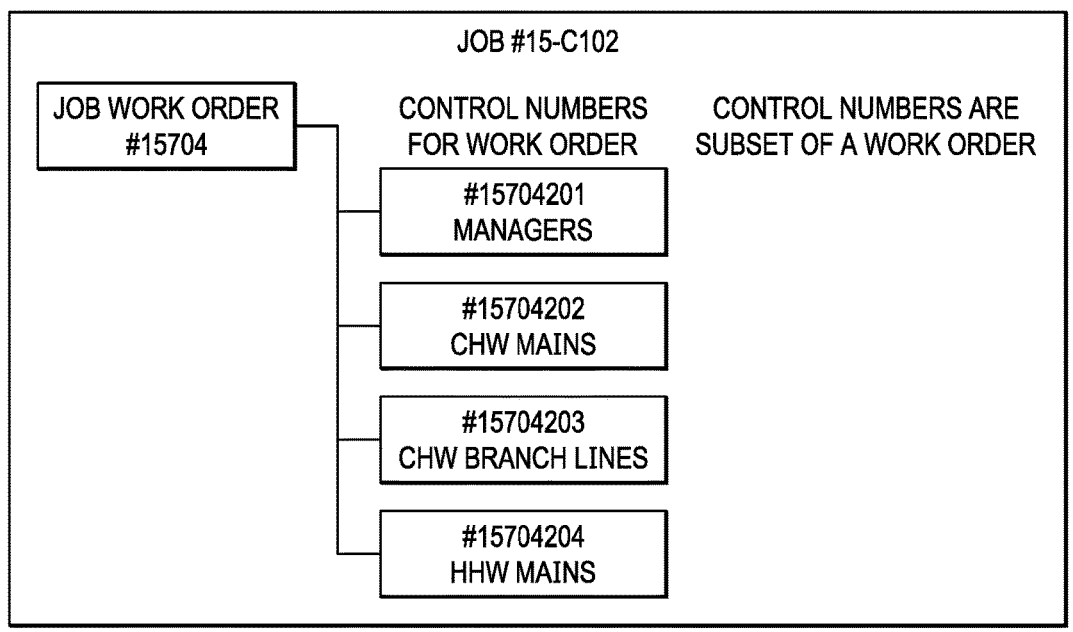
FIG. 3 is another example work order with an assigned job number, workflow order number, and line items, according to certain example embodiments.

As an example, the work order illustrated in FIG. 2 includes job number 15-D023. The job number can be associated with metal fabrication for a new HVAC project. The job work order number 4397 can identity a specific job associated with the fabrication process. The line items associated therewith can include loose materials, identified by line item number 100, LP supply wrap, identified by line item number 101, MP supply wrap, identified by line item number 102, LP supply lined, identified by line item number 103, and outside air wrap, identified by line item number 104. As a further example, the work order in FIG. 3 can include job number 15-C123. The job number can be associated with a piping fabrication for a new drainage system project. The work order number 15704 can identify a specific job associated with the fabrication process. The line items associated therewith can include hangers, identified by line item number 301, CHW mains, identified by line item number 302, CHW branch lines, identified by line item number 303, and HHW mains, identified by line item number 304. The line items in this particular case are inventory items that can be used in fabrication and packaging. The work order, as being processed, can accumulate other line items relating the fabrication and distribution process, as will be discussed in more detail shortly. In addition, the work order can also comprise a nested configuration wherein multiple job work order numbers can be included for a job number with each job work order number including at least one line item. In either case, the number of line items associated with a job work order number can include a single line item or a plurality and the job numbers, work order numbers, and associated line items can dictate a processing sequence and/or a fabrication and distribution sequence.

The order management system 14 can generate the fabrication order data and provide it to the order workflow system 12. The order workflow system 12 can process received work order data and provide the work order data to an appropriate fabrication system or systems according to fabrication process type. The order data can be managed and processed using process queues based on fabrication system data, network services data, and ERP data. In other words, the work order data can be used to integrate the fabrication and distribution system or systems with accounting, auditing, and reporting tools in an organized, structured manner in order to facilitate and improve, i.e. make it more efficient and less expensive, the fabrication process.

Referring now to FIGS. 4A-4C, illustrated are User Interfaces (UI) for creating work orders, according to certain example embodiments. In the example embodiment, the UI interface includes a selectable lists link, shop time data link, jobs and projects link, reports link, and contacts link that are linked to associated data structures. The linkable interfaces can be over an HTTP transport and the content HTML and JavaScript generated HTML based. The list link can provide a form that allows for the creation of work orders for sheet metal and piping (PPG) work orders, as well as service work orders and shop to shop work orders. FIG. 4A illustrates a new work order form for creating a work order for a sheet metal fabrication process or a piping and plumbing fabrication process. A requester can enter the job number and system can automatically attached all cost codes to the job number. In other words, all cost cost recognized by ERP can be automatically mapped to the job number. This provides a mechanism by which relevant line item data can be easily mapped to appropriate cost structures. FIG. 4B illustrates a work order form for entering line item information about a sheet metal fabrication process. Although not exhaustive, the information items can include fabrication system, whether a CAM (Computer Aided Machining) is required, attached drawings, the due date, and other information. FIG. 4C is a work order form for entering line item information about a sheet metal fabrication process. Although not exhaustive, the information items can include job number, drawing attachments, order due date, overtime authorization, cost codes, CAM (specification and BIM Computer Aided Design (CAD) drawings) required, spooling (specification only) required, and inventory items.

Figure 5:
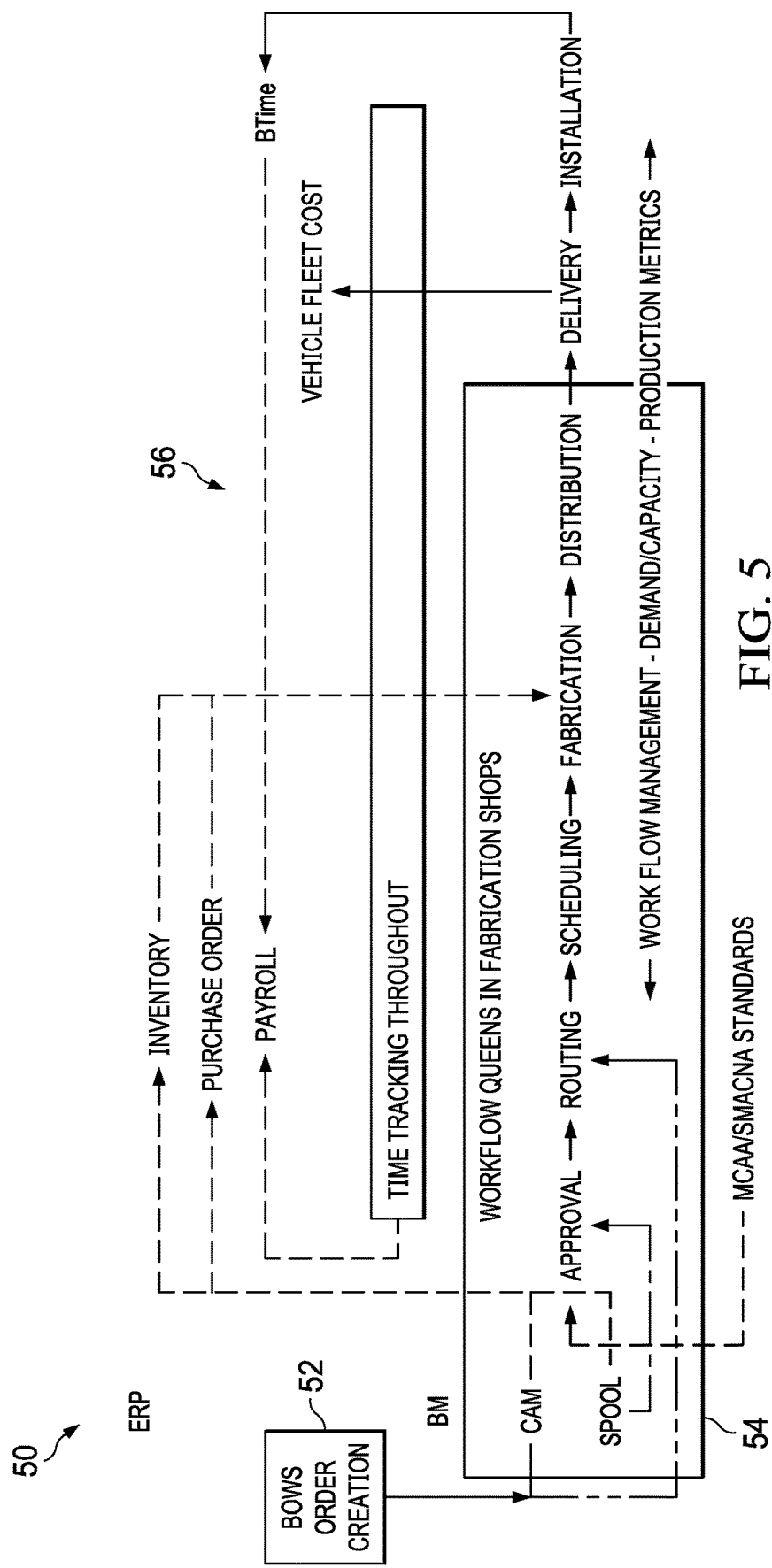
FIG. 5 is an illustration of a flow diagram for processing fabrication, distribution, delivery, and installation queues and interfaces for work order data relating to fabrication, distribution, delivery, and installation of either metal or piping fabrication, according to certain example embodiments.

Referring now to FIG. 5, illustrated is a flow diagram for processing fabrication and distribution queues and interfaces for work order data relating to fabrication and distribution of either metal or piping fabrication, according to certain example embodiments, denoted generally as 50. The flow diagram 50 includes an order creation queue 52, a BIM queue 54, and an ERP interface 56. The BIM queue 54 includes a cam, spool, approval, routing, scheduling, fabrication, and distribution sub-queues. Additional sub-queues thereto include delivery and installation. The ERP interface 56 includes a time tracking, payroll, purchase order, inventory, and vehicle fleet cost interfaces. The flow diagram further includes a workflow management interface and a standards interface for MCAA/SMACNA (Mechanical Contractors Association of America/Sheet Metal and Air Conditioning Contractors' National Association) and NECA (National Electrical Contractors Association).

The order workflow system 12 monitors processing queue 52 for received fabrication order data and processes the fabrication order data accordingly. The fabrication order data can be designated as either a cam spooling or simply a spooling order. The difference being that the cam spooling order includes drawing or drawings and specifications generated from BIM computer aided design system and the spooling order includes specifications without a CAD drawing and, therefore, requires approval before fabrication. Dependent upon the type of order, the workflow system 12 can process the order data in a pre-defined manner. In the case of order data defined as spooling, the workflow system 12 receives and processes non-BIM related construction design specifications and routes the design specifications to the approval queue. Upon approval of the product items, the workflow system 12 can import from a BIM database over a BIM interface inventory line items related to the design specifications. The workflow system can also write the inventory line items to the inventory management and purchase order interfaces 30, 38. In the case of order data defined as cam spooling, the workflow system 12 processes the attached drawing(s) and specifications and interfaces with a BIM database over a BIM interface to access inventory line items associated with the drawing or drawings. The workflow system 12 can then write the inventory line items to the inventory and purchase order interfaces 30, 38.

The MCAA/SMACNA and NECA standards can be provided to or accessed by the approval sub-queue to facilitate the approval process. The system 12 can provide fabrication system's demand and capacity data to the routing sub-queue for use in determining to which fabrication system or systems an order should be routed. Additionally, the system 12 can report production metrics indicating how much product is actually being built. In addition, time tracking can be interfaced with the payroll interfaces through fabrication and distribution as well as the vehicle fleet cost. In addition, any data provided by or generated by the system 10 in response to a fabrication process associated with a work order can be assigned a control number associated with a job number of the work order.

Figure 6:
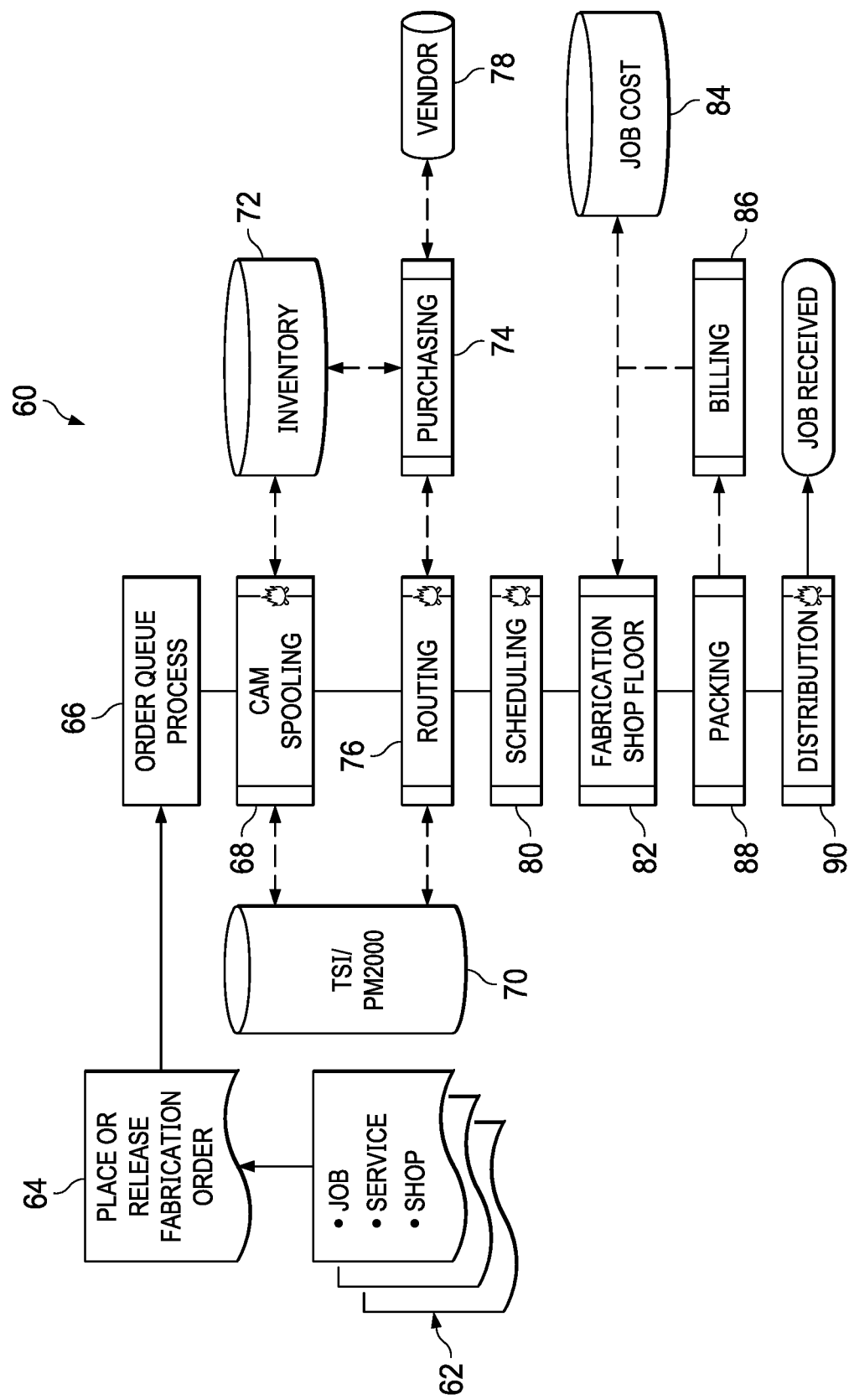
FIG. 6 is an illustration of a fabrication and distribution processing algorithm for processing queues and sub-queues associated with metal fabrication order data, according to certain example embodiments.

Referring now to FIG. 6, illustrated is a fabrication and distribution processing algorithm for processing queues and sub-queues associated with fabrication order data, according to certain example embodiments, denoted generally as 60. The algorithm 60 receives orders 62 at processing block 64 that either require a BIM CAD drawing or can be placed without the BIM CAD drawing and queues the orders for further processing at the order queue process, block 66. If the order requires a BIM CAD drawing, the algorithm 60 continues at block 68 where the cam spooling sub-queue processes the order data by interfacing with the BIM/CAD database 70 to identify and receive inventory line items. At block 68, the cam spooling sub-queue further processes the inventory line items by interfacing the inventory line items with the inventory and purchasing interface module 72, 74 of the ERP interface 56. If the order data does not require a BIM CAD drawing, the order data is directly queued for routing at block 76.

At block 76, the routing sub-queue further processes the cam spooling sub-queue data by determining a fabrication system for the order based on order type and at least one of demand/capacity and production metrics. The routing queue can further receive a purchase order from the purchasing interface module 74 The routing queue can further determine if the purchase order is consistent or inconsistent with the order data and modify the order data by further interfacing with the BIM/CAD database 70. In other words, if vendor database 78 produces purchasing results that includes different product type or types than originally requested, the order data can be updated to reflect as much. In addition, if there is a shortage of product, the shortage can be indicated and the order data updated to reflect as much or different product items can be added. At block 80, the scheduling sub-queue can render order data for a fabrication system based on a scheduling time line determined by at least one of queued orders, demand and/or capacity, and product metrics. At block 82, the fabrication sub-queue processes work order data and monitors and processes work order related data from field devices. The work order related data can include fabrication metric values, such as achieved milestones and status, time entry data, and material consumption related to the fabricated item. The metrics values can be interfaced with network services 16, metrical consumption values can be interfaced with job cost database 84, and time entry associated with fabrication can be interfaced with billing interface 86. All, or at least part, of the data generated in response to the packaging and distribution sub-queues can be assigned to a line item number and job number to create a control number.

Once fabrication is completed, fabrication sub-queue can queue the data for processing at block 88. At block 88, packaging sub-queue can process order data and associated order data by providing notification of the received order, receiving progress status notifications, receiving a number and identification of fabrication item or items packaged, for example from barcode scanner data, and time entry data. The order data and associated order data can be interfaced with the billing interface 86 and network services 16. The order data and associated packaging data can be queued for processing at block 90. At block 90, fabricated items shipped to a construction site are monitored and tracked at a distribution queue. The status of the fabricated items or items can be tracked and monitored until received at a job site. All, or at least part, of the data generated in response to the packaging and distribution sub-queues can be assigned to a line item number and job number to create a control number.

Figure 7:
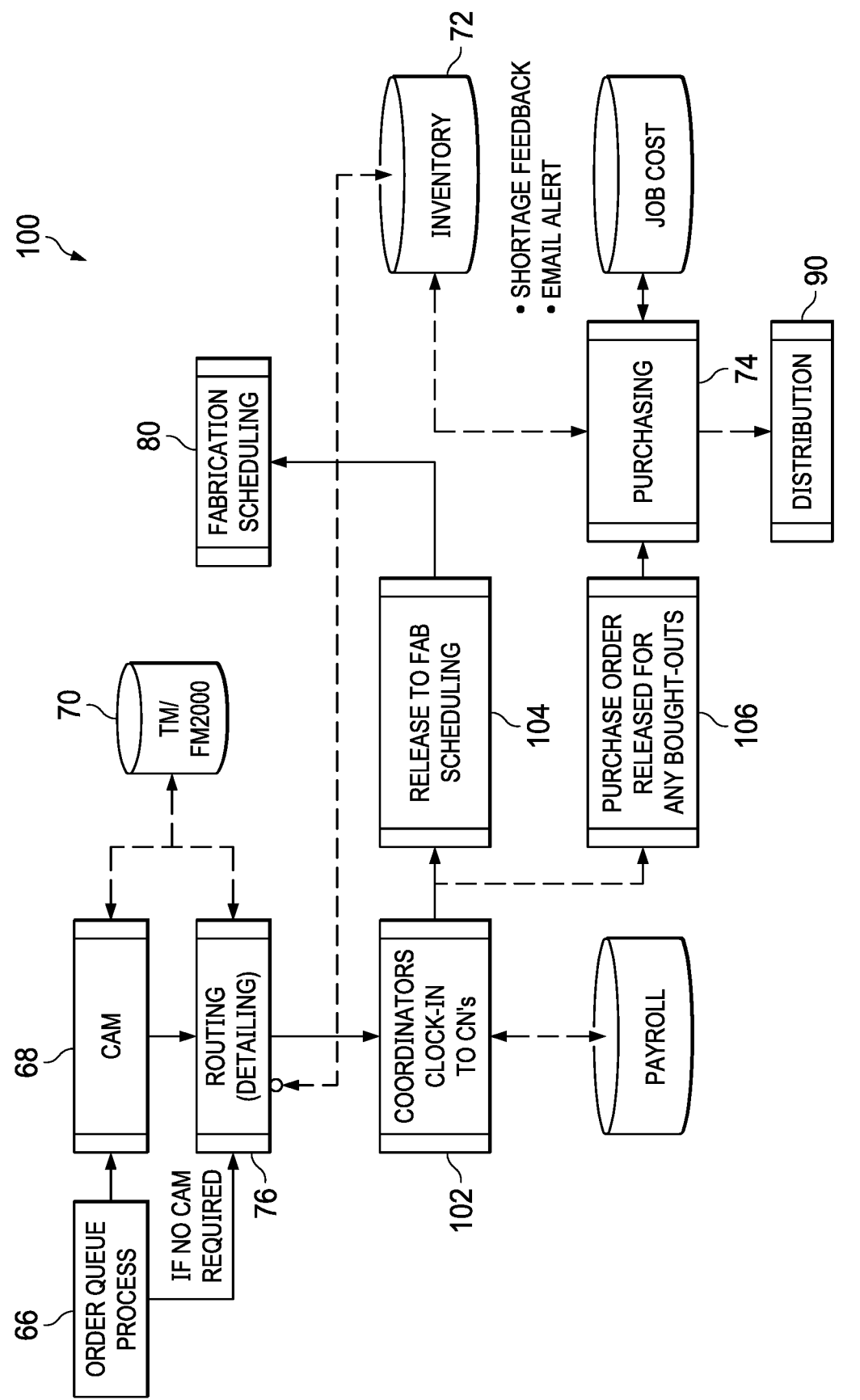
FIG. 7 is an illustration of a subset with additional functionality of the fabrication and distribution processing algorithm of FIG. 6 for processing queues and sub-queues associated with cam spooling order data, according to certain example embodiments.

Referring now to FIG. 7, illustrated is subset with additional functionality of the fabrication and distribution processing algorithm 60 for processing queues and sub-queues associated with cam spooling order data, according to certain example embodiments, denoted generally as 100. The algorithm 100 begins at block 66 where order data is queued for processing at order queue process. The order queue process determines if the order is an order that requires a BIM CAD generated specification and drawing or rather the order data can be processed without such. In the event that the order queue process determines that the order data requires a BIM CAD generated specification and drawing, the order data is queued for processing at block 68. If the order queue process determines that a BIM CAD generated specification and drawing is not required, the order data is queued for processing at block 76. At block 68, the algorithm 100 can access and retrieve inventory items from BIM/CAD database 70 and then queue the order data for processing at block 76. At block 76, the algorithm 100 can also access and retrieve inventory items from BIM/CAD database 70. At block 76, if determined the available inventory from inventory interface module 72 does not satisfy order data requirements, the routing sub-queue can alter the order data using alternative inventory items from the BIM database 70. A notification of the inventory shortage can be sent to the purchasing interface 74 and to the routing sub-queue 76. The order data can then be queued for processing at block 102. At block 102, project coordinators can clock-in and review the order data at coordinator clock-in queue. Time entry data associated with the clock-in's can be sent to the payroll interface. The project coordinators can update order data with purchase requests for pre-fabricated systems from other vendors. The order data can then be queued for processing at block 104 and 106. At block 104, the release to fab scheduling sub-queue can release the order data to fabrication scheduling 80 upon approval of all coordinators. At block 106, any purchase orders can also be released upon approval by the coordinators. Additionally, the order data can be queued for further processing at block 90. At block 90, the distribution sub-queue can monitor the status of a purchase order can provide status notifications.

Figure 8:
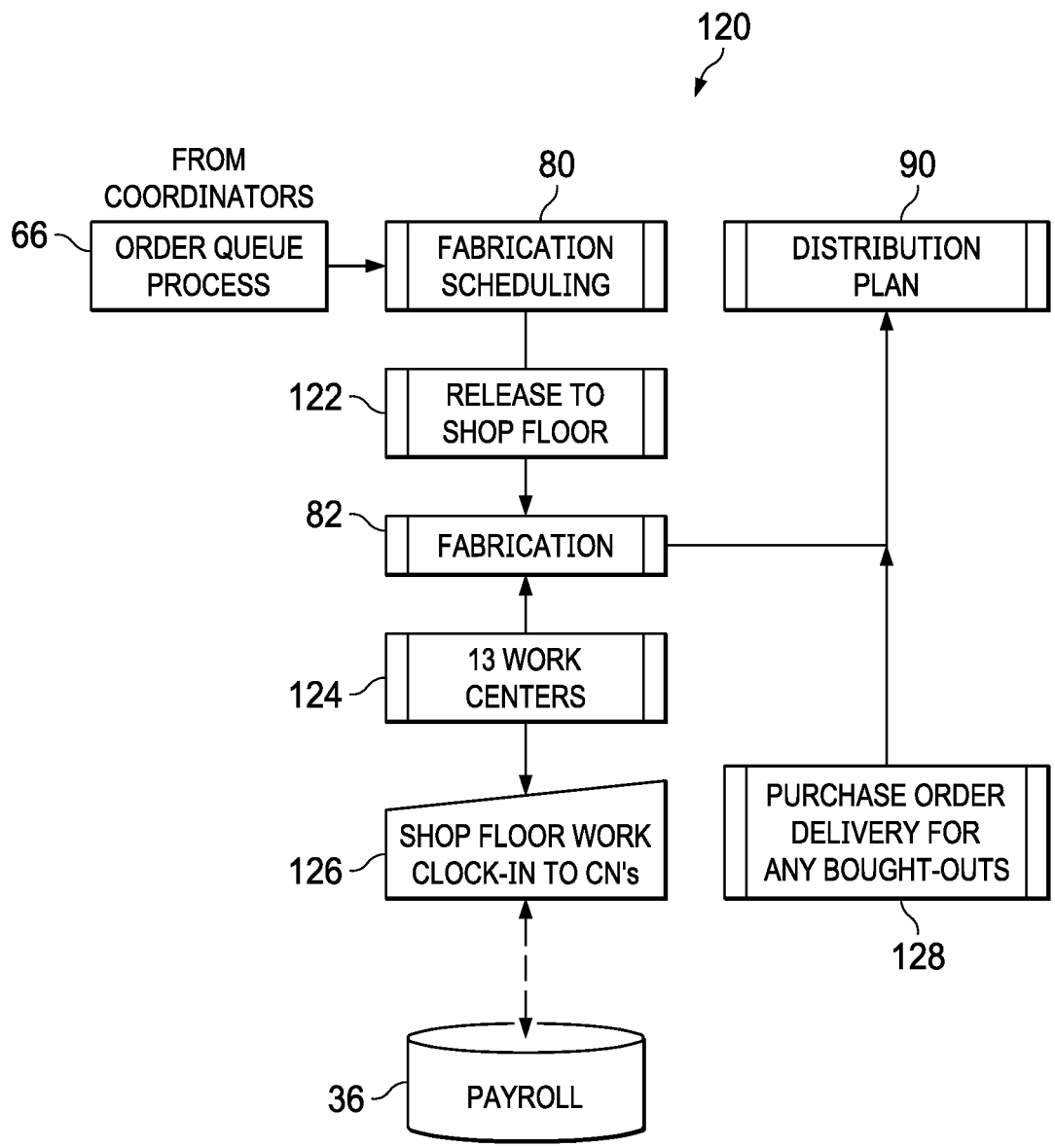
FIG. 8 is an illustration of another subset with additional functionality of the fabrication and distribution processing algorithm of FIG. 6 for processing queues and sub-queues associated with cam spooling order data, according to certain example embodiments.

Referring now to FIG. 8, illustrated is another subset of the fabrication and distribution processing algorithm 60 for processing queues and sub-queues associated with cam spooling order data, according to certain example embodiments, denoted generally as 120. The algorithm 120 begins at block 66 where order data released from coordinators is queued for processing at the fabrication scheduling sub-queue, block 80. The fabrication scheduling sub-queue can queue the order data for processing at block 122 at the scheduled date. The release to shop floor sub-queue, block 122, can determine a fabrication facility or facilities based on capacity and demand and queue the order data for processing by the selected fabrication facility or facilities sub-queue. The fabrication sub-queue can monitor progress from at least one work center sub-queue, block 124. The work center sub-queue can provide clock-in and clock-out data, block 126, associated with a control number or numbers and interface the time entry data with the ERP payroll interface 136. The distribution sub-queue, block 90, receives and processes order data from fabrication sub-queue and a purchase order for any bought outs at purchase order delivery sub-queue, block 128. The distribution plan can be defined, at least in part, by the control numbers of the order data, as will be discussed in more detail in reference to FIG. 13 and related description.

Figure 9:
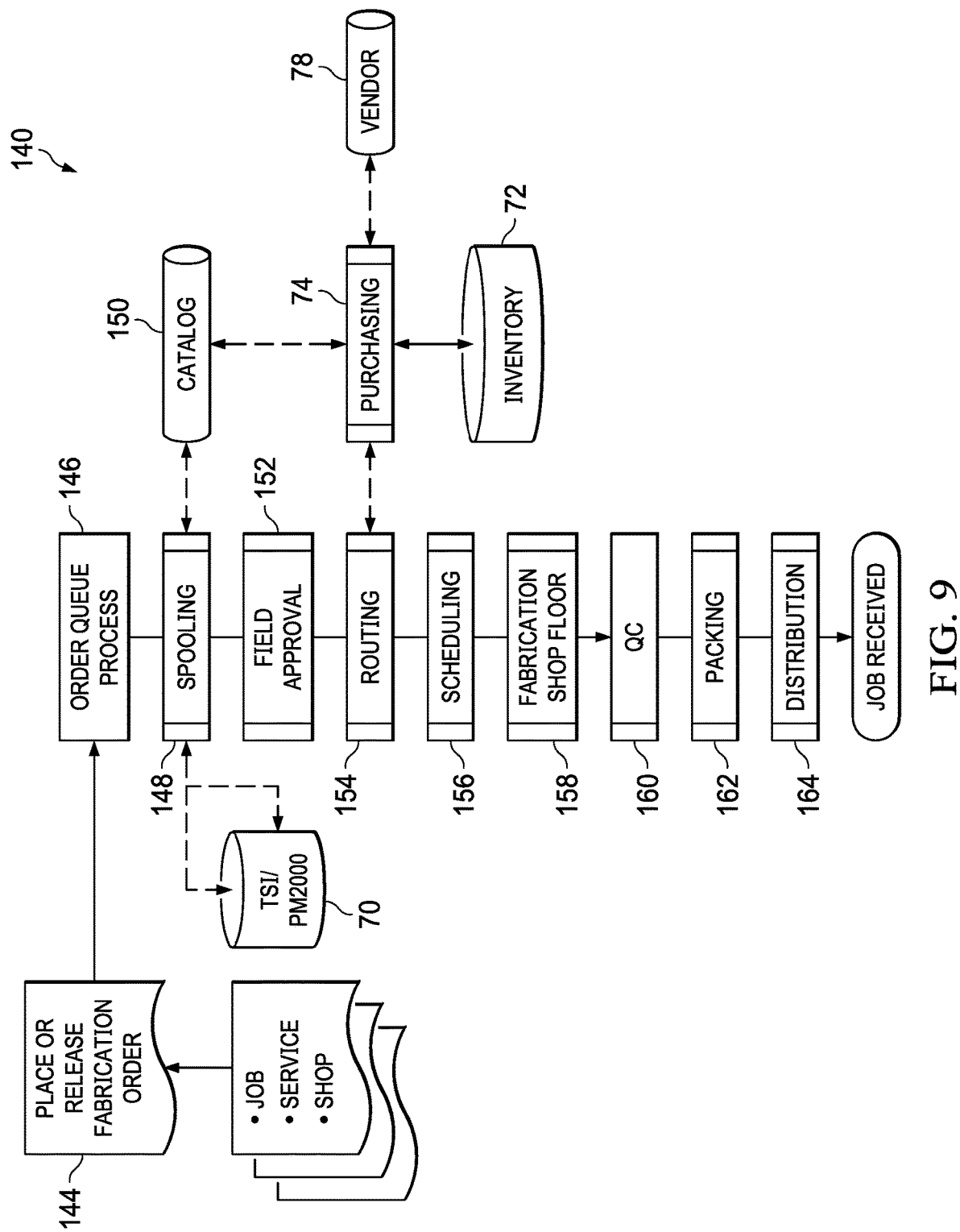
FIG. 9 is an illustration of a fabrication and distribution processing algorithm for processing queues and sub-queues associated with piping fabrication order data, according to certain example embodiments.

Referring now to FIG. 9, illustrated is a fabrication and distribution processing algorithm for processing queues and sub-queues associated with fabrication order data, according to certain example embodiments, denoted generally as 140. The algorithm 140 receives orders 142 at processing block 144 that have either been approved for release or have not been approved for release and queues the orders for processing at block 146. At block 146, the order queue process queues the order data for processing at block 148. At block 148, the spooling sub-queue determines if the order is approved for release or requires approval. If the order is an order that requires approval, the spooling sub-queue imports inventory line items from BIM/CAD database 70, obtains products identifiers from product catalog 150, and queues the order data for further processing at block 152. At block 152, the field approval sub-queue makes the order data available to project coordinators for approval. If the order is an order ready to be placed, the spooling sub-queue queues the order data for processing at the field approval sub-queue where the release authorization is recorded and the order data is queued at block 154 for further processing. At block 154, the routing sub-queue sends a purchase order request over the ERP interface, determines a fabrication facility or facilities based on capacity and demand, and schedules the order for fabrication based on the order data. The routing sub-queue then queues the data for processing at block 156. At block 156, the scheduling sub-queue queues the data for fabrication at block 158 at the designated date. At block 158, the fabrication sub-queue can receive and process fabrication input associated with the fabrication process and interface the input to the ERP system 18 and network services 16. The fabrication sub-queue can queue the order data for further processing at block 160. At block 160, the Quality Control (QC) sub-queue can make the order data available to QC experts and release the order data to block 162 upon approval by the QC experts. At block 162, the packing and distribution sub-queues process and manage order data related to the packing and distribution process. The packing and distribution process will be discussed in more detail in reference to FIG. 13 and the related description.

Figure 10:
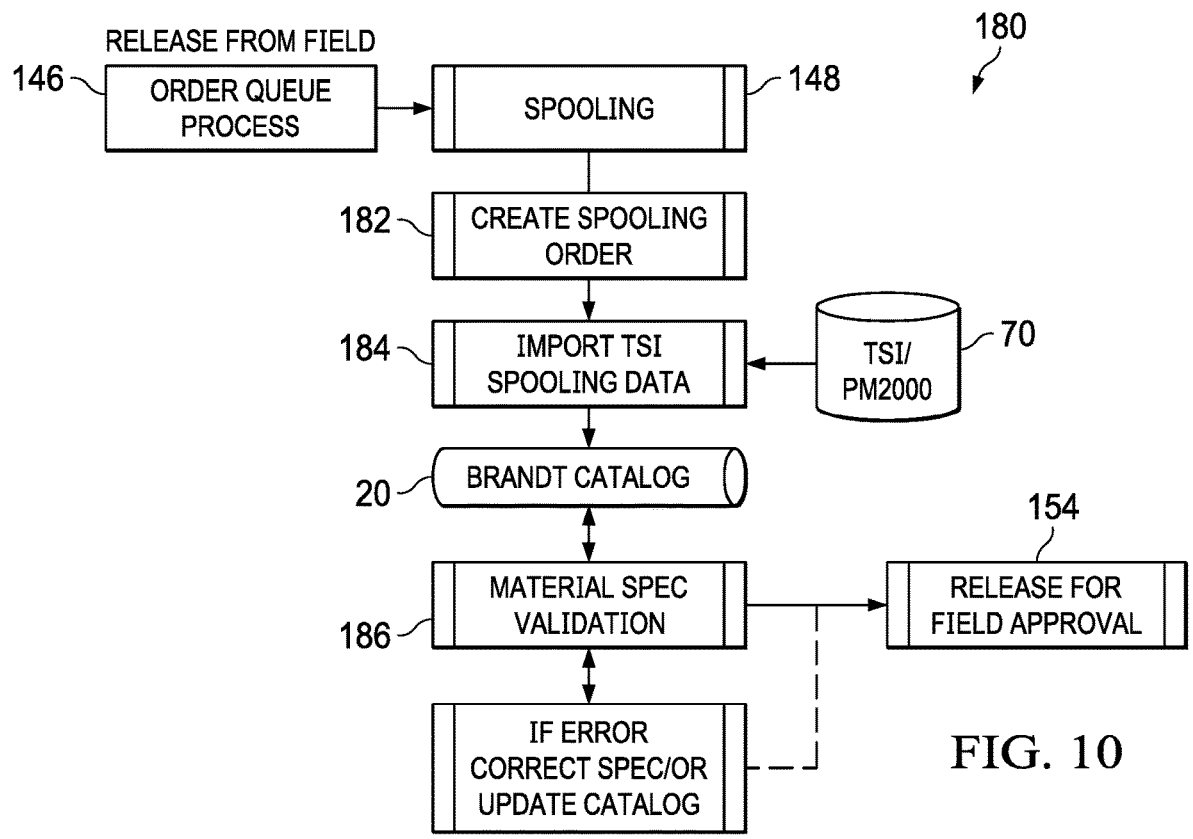
FIG. 10 is an illustration of a subset with additional functionality of the fabrication and distribution processing algorithm of FIG. 9 for processing queues and sub-queues associated with a piping fabrication order, according to certain example embodiments.

Referring now to FIG. 10, illustrated is a subset with additional functionality of the fabrication and distribution processing algorithm 140 for processing queues and sub-queues associated with a piping fabrication order, according to certain example embodiments, denoted generally as 180. The algorithm 180 continues at the order queue process, block 146. At block 146, the order queue process queues the order data for processing at block 148. At block 148, the spooling sub-queue process determines if the order data requires field approval before releasing to fabrication. If approval is required, the order data is queued at block 182. At block 182, the create spooling order sub-queue queues the order data for creation of spooling data at block 184. At block 184, the import BIM data sub-queue imports inventory line items from the BIM/CAD database 70 based on the order data and queues the order data for further processing at block 186. At block 186, the material specification validation sub-queue imports product specification data from the product catalog 20. The validation sub-queue validates the production specification with the inventory line items to determine if the production specification meets the specification requirements of the inventory line items and order data. If there are validation errors, either the line items are updated or the specifications from the catalogue are updated. If there are no validation errors, the order data is released for field approval at block 154.

Figure 11:
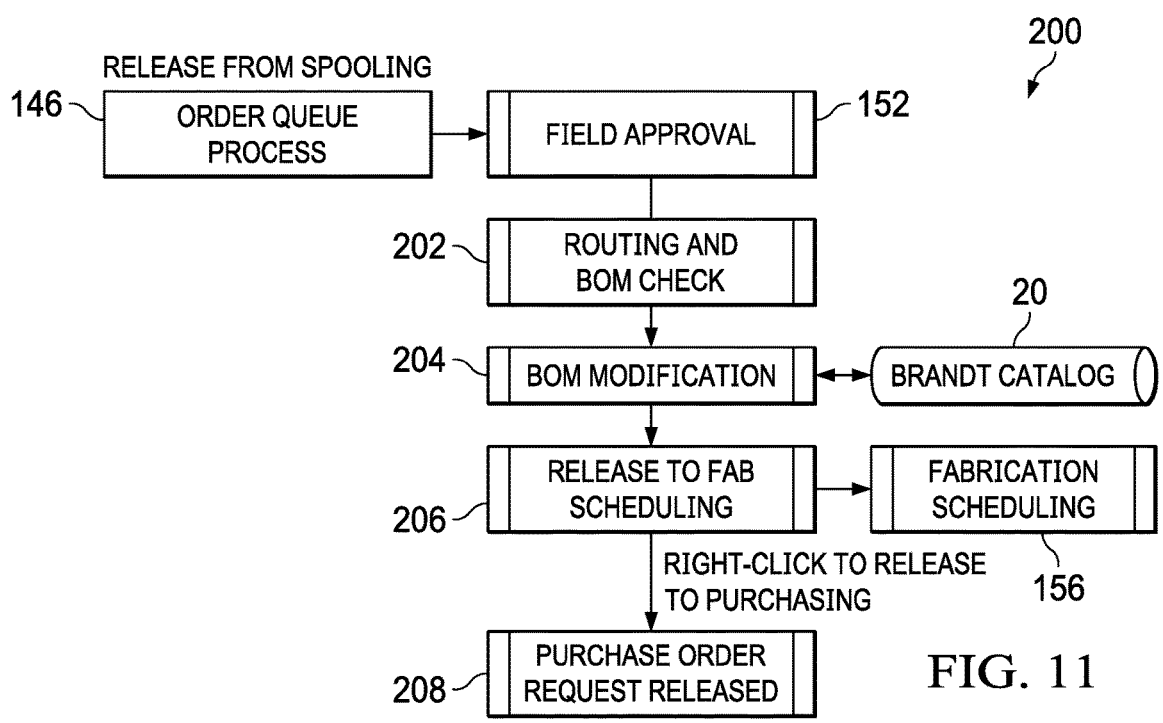
FIG. 11 is an illustration of another subset with additional functionality of the fabrication and distribution processing algorithm FIG. 9 for processing queues and sub-queues associated with a piping fabrication order, according to certain example embodiments.

Referring now to FIG. 11, illustrated is a subset with additional functionality of the fabrication and distribution processing algorithm 140 for processing queues and sub-queues associated with a piping fabrication order, according to certain example embodiments, denoted generally as 200. The algorithm 180 continues at the order queue process, block 146. At block 146, the order queue process queues the order data for further processing at block 152 in response to order data being released from spooling. At block 152, the field approval queue records the approval and queues the order data for further processing at block 202. At block 202, the routing and BOM check sub-queue determines if modifications to the inventory line items has been requested. If modifications have been requested, the order data is queued for further processing at block 204. At block 204, the BOM modification sub-queue updates the order data with the requested change by access and retrieving the relevant inventory line items from the product catalog 20. If there are no modification requests or the changes have been made, the order data is queued for further processing at block 206. At block 206, the release to fabrication scheduling sub-queue releases the order data to fabrication scheduling, block 156, and to block 208 for further processing. At block 208, the purchase order request released sub-queue processes the order data and generates a purchase order for interfacing with the appropriate interface of the ERP system 18.

Figure 12:
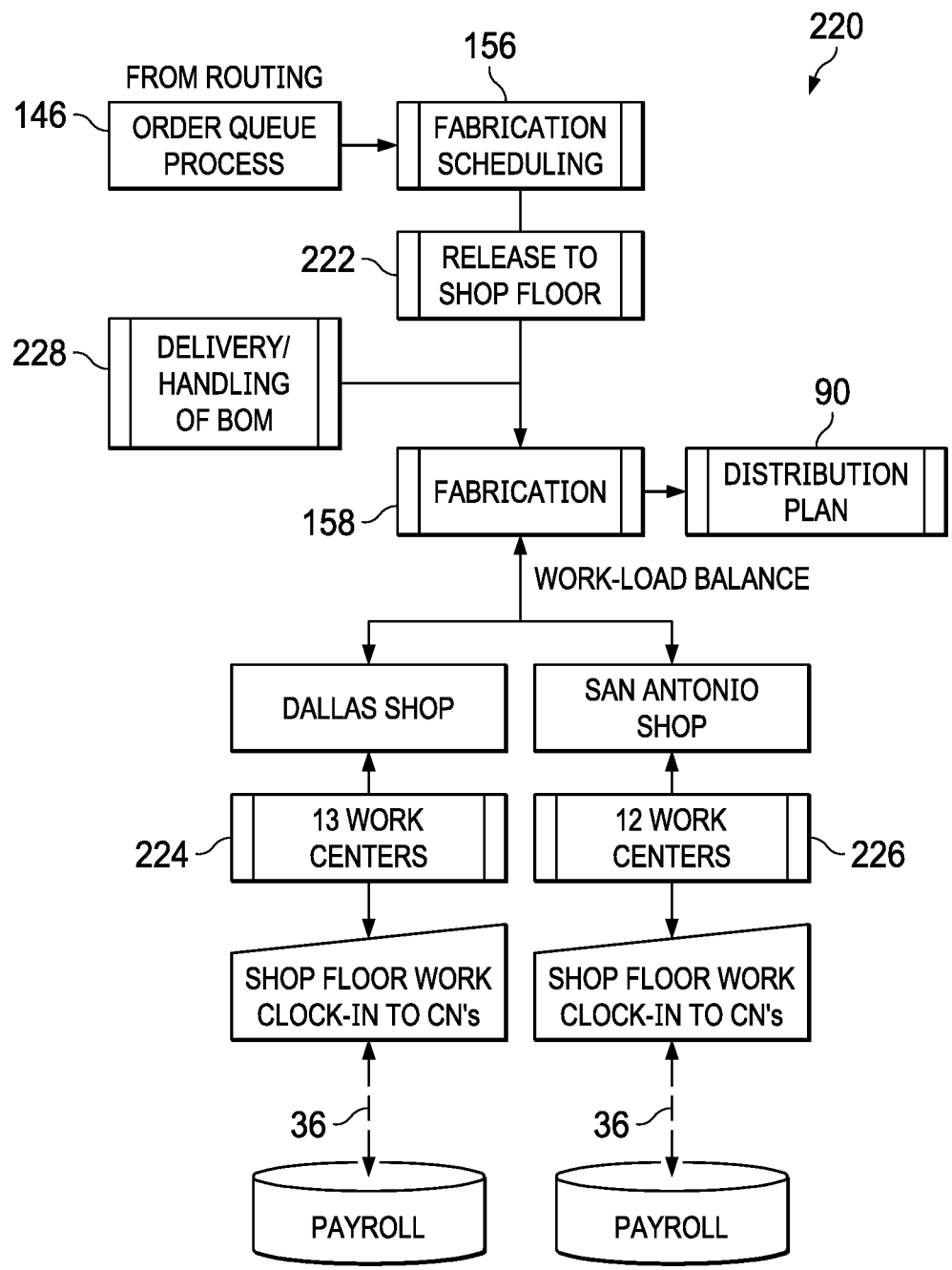
FIG. 12 is an illustration of another subset with additional functionality of the fabrication and distribution processing algorithm FIG. 9 for processing queues and sub-queues associated with a piping fabrication order, according to certain example embodiments.

Referring now to FIG. 12, illustrated is a subset with additional functionality of the fabrication and distribution processing algorithm 140 for processing queues and sub-queues associated with a piping fabrication order, according to certain example embodiments, denoted generally as 220. The algorithm 220 continues at the order queue process, block 146. At block 146, the order queue process queues the order data for further processing at block 156 in response to order data being released from the routing sub-queue. At block 156, the fabrication scheduling sub-queue schedules fabrication according to the order data and queues the data for further processing at block 222. At block 222, the release to shop floor sub-queue queues the data for further processing at block 158 in response to the scheduling date. At block 158, the fabrication sub-queue can monitor work center sub-queues, block 224, 226, to determine work load balance based on demand and capacity. The fabrication sub-queue can also monitor the delivery/handling of BOM sub-queue, block 228, for additional instructions for handling the delivery of the order data. Based on the work load and the additional instructions, the fabrication sub-queue can assign the order data to at least one work center. The work center sub-queues 224, 226 can monitor fabrication progress, receive time entry data, and queue the fabrication status with the fabrication sub-queue for further processing and interface time entry data with the payroll processing module 36 of the ERP system 18. Upon completion of the fabrication process, the fabrication sub-queue can queue the order data for further processing at block, 90. At block 90, the distribution sub-queue processes the order data to determine a distribution plan. The details of such will be discussed in further detail in reference to FIG. 13 and the relevant description.

Figure 13:
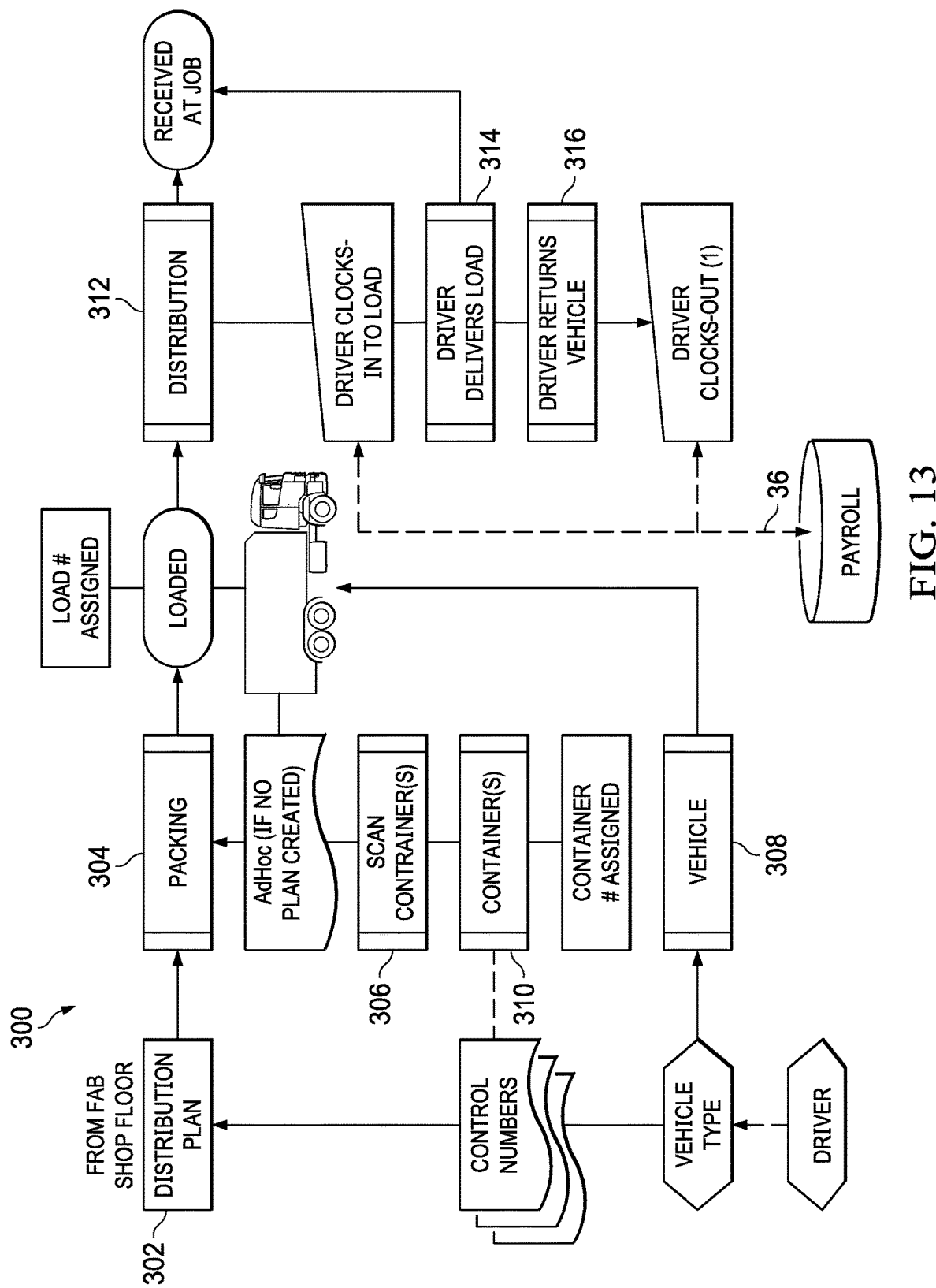
FIG. 13 is a block diagram of a distribution plan algorithm, according to certain example embodiments.

Referring now to FIG. 13, illustrated is a block diagram of a distribution plan algorithm, according to certain example embodiments, denoted generally as 300. The algorithm 300 begins at block 302. At block 302, the distribution plan queue processes order data and determines a vehicle type, vehicle, shipping container, and a driver based on capacity, demand, and order data. The distribution plan queue can process order data to determine a packing center and assign the order data for packing. The order data can then be queued for further processing at block 304. At block 304, the packing sub-queue monitors for container identifiers from block 306 and assigned vehicles from vehicle sub-queue, block 308. At block 306, scan container sub-queue processes container identifiers received from at the assigned container sub-queue, block 308 and queues the data for further processing at block 304. Once the container is loaded and a load number assigned, the packing sub-queue queues the order data for further processing at block 308. At block 312, the distribution sub-queue receives and processes data associated with order distribution. The distribution sub-queue receives driver clock-in data from the driver and interfaces the clock-in data to the pay-roll processing interface 36 from the ERP system 18 and queues the order data for further processing at block 314. At block 314, the driver delivers load sub-queue receives notification of when the driver delivers a load and queues the order data for further processing at block 316. At block 316, the driver returns the vehicle sub-queue receives notification when the driver returns the vehicle and clocks-out. The clock-out data can be interfaced with the payroll interface 36 of the ERP system 18.

Figure 14:
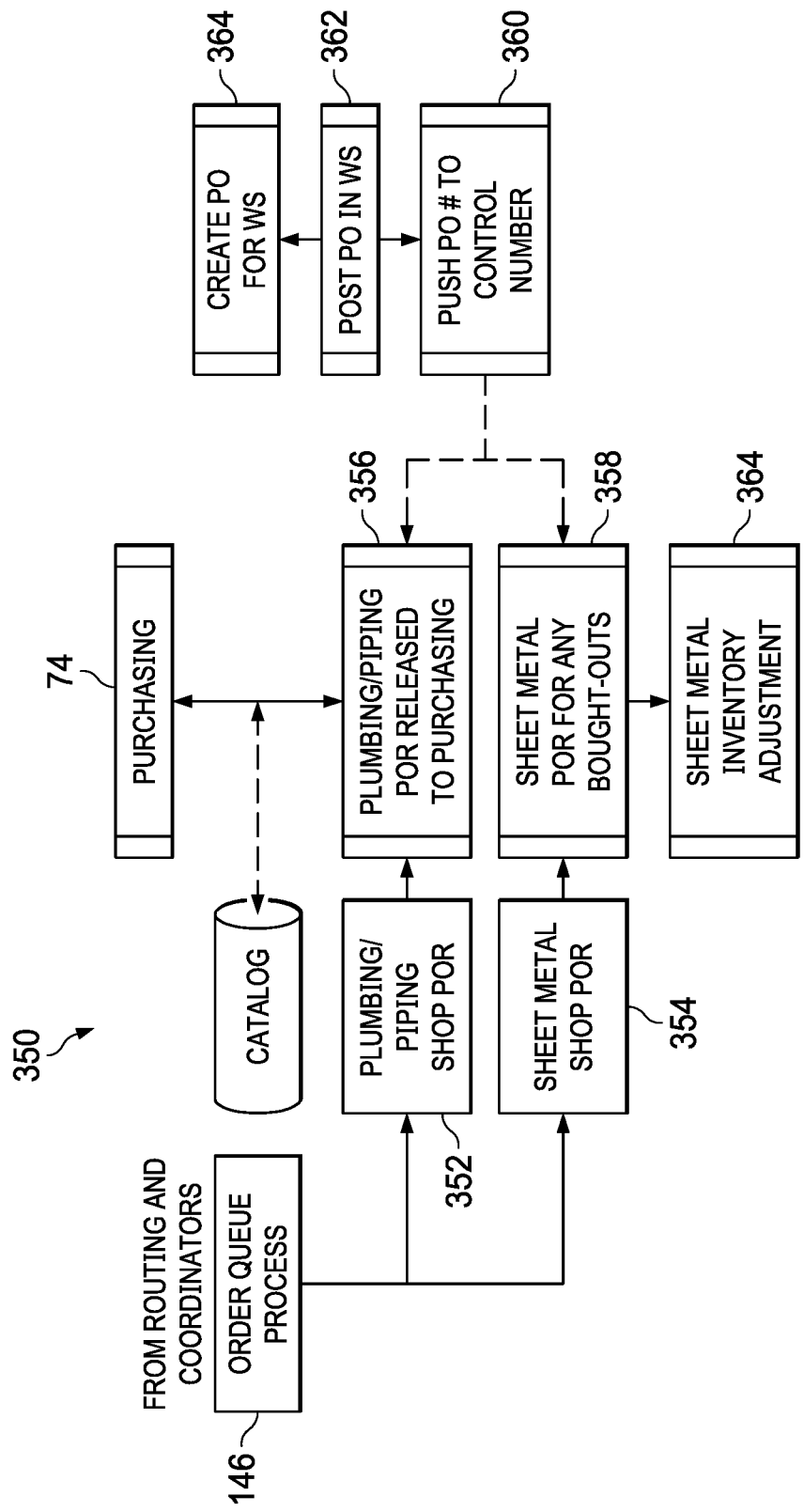
FIG. 14 is a block diagram of a purchase order request algorithm for a plumbing/piping fabrication order and a sheet metal fabrication order, according to certain example embodiments.

Referring now to FIG. 14, illustrated is a block diagram of a purchase order request algorithm, according to certain example embodiments, for a plumbing/piping fabrication order and a sheet metal fabrication order, denoted generally as 350. The algorithm 350 begins at block 146. At block 146, the order queue process determines order data that includes a Purchase Order Request (POR) or requests from the routing sub-queues and the coordinators clock-in to CN's sub-queue and queues the data for further processing at either block 352 or 354, depending on the order type. At block 352, the plumping/piping shop POR sub-queue processes relevant order data and queues the order data for further processing at block 356. At block 354, the sheet metal shop POR sub-queue processes relevant order data and queues the order data for further processing at block 358. At block 356, the plumbing/piping POR released to purchasing sub-queue queues the POR for processing at block 360. At block 358, the sheet metal POR for any bought-outs sub-queue queues the POR for further processing at block 360. At block 360, the push PO # to control number sub-queue receives created Purchase Orders (PO) from create a post sub-queue processes 362, 364, and queues relevant PO's for processing at block 356, 358. At block 356, the plumbing/piping POR released to purchasing sub-queue queues received PO's for further processing at purchasing sub-queue, block 74. The purchasing sub-queue can then make changes, if necessary, according to the product catalog and release the PO to the purchasing interface 38 of the ERP system 18. At block 358, the sheet metal POR for any bought-outs sub-queue queues the PO for further processing at block 364. At block 364, the sheet metal inventory adjustment sub-queue processes the PO and adjusts sheet metal inventory accordingly.

Figure 15:
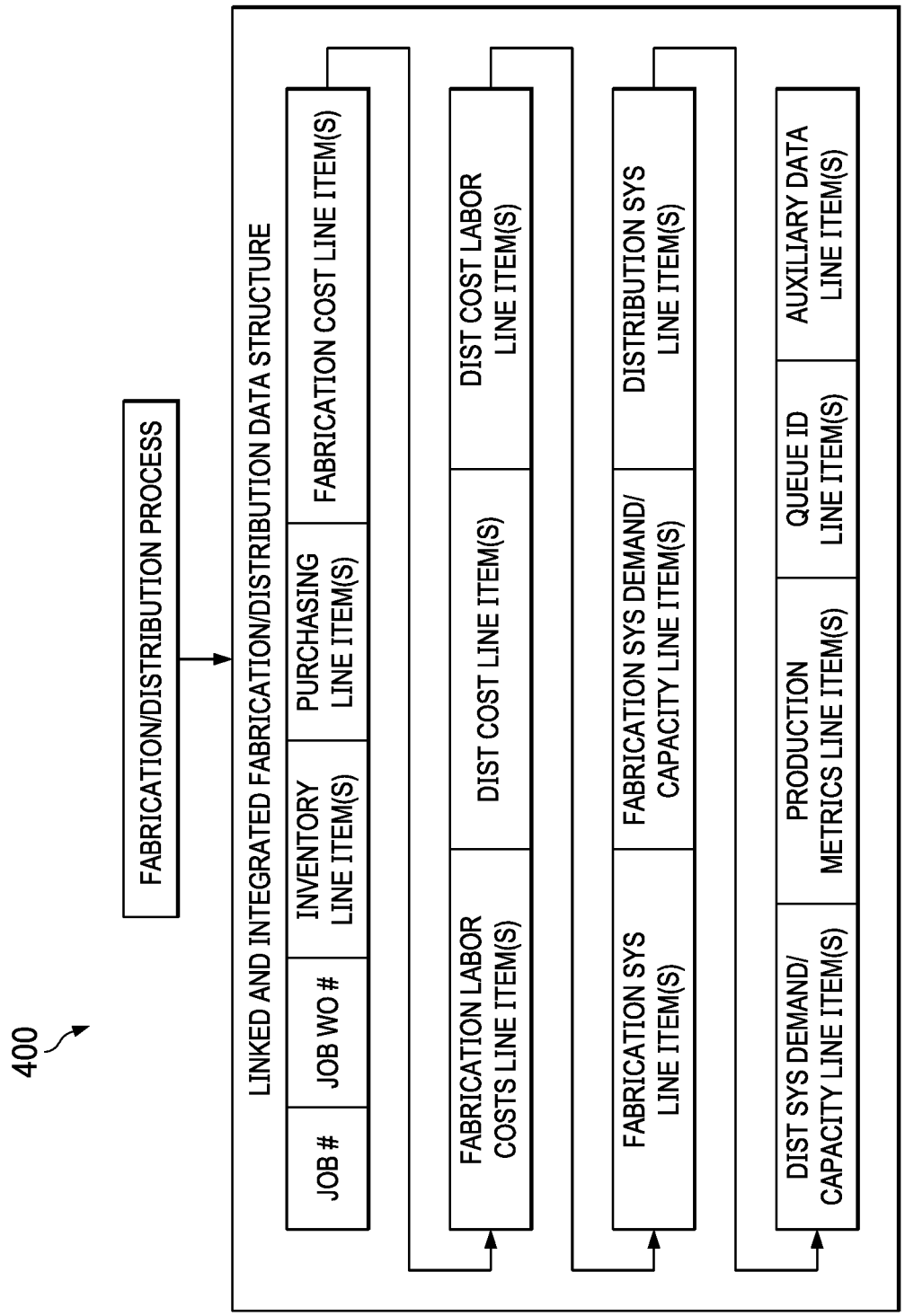
FIG. 15 is an illustration of a data structure defining various aspects of a fabrication and distribution process, according to certain example embodiments.

Referring now FIG. 15, illustrated is a data structure defining various aspects of a fabrication and distribution process, according to certain example embodiments, denoted generally 400. The data structure 400 provides a real-time snapshot of the fabrication and distribution process progress, supply chain supply and demand, various metrics, and costs. The data structure 400 can include data associated with processes and controls of the fabrication and distribution of materials used in construction projects, e.g. metal, plumbing, and piping construction projects. The data structure includes a job number, a job work order number, inventory line item(s), purchasing line item(s), fabrication cost line item(s), shipping cost line item(s), fabrication system line item(s), fabrication system(s) demand capacity line item(s), distribution system(s) line item(s), distribution system(s) demand capacity line item(s), production metrics line item, queue identification line item, and auxiliary data line item. The job number could be a system or systems number, e.g. system or system could be a fabrication facility or facilities, and some of the line items, such as system demand and capacity, could provide an overall or enterprise level view of the facility or facilities. In addition, some of the line items may be directly related to the job number and have no association with the job work order number.

The work order number and inventory line item(s) data item defines a control number that can be associated to an inventory item related to a fabrication product for a construction project. The inventory line item or items can be used by the network services 16, ERP system 38, and the fabrication/distribution system to enable and facilitate reporting, auditing, accounting, fabrication, and distribution of an overall construction project. For example, a material item used in the fabrication of a drainage system or an HVAC system can be tracked for the duration of the fabrication and distribution process and can be definitely linked to the fabricated product for reporting, auditing, and accounting purposes. By providing this level of granular process control, valuable information can be gleaned from a real-time and historical perspective.

The work order number and purchasing line item(s) data item defines control numbers that can be associated to a purchase order generated during a fabrication process. The purchase orders can be associated with a job number, inventory item(s) or services, an order date, a delivery date, a fabricated product, and a fabrication system. The purchasing line item or items can be used by the network services 16, ERP system 38, and the fabrication/distribution system to enable and facilitate reporting, auditing, accounting, fabrication, and distribution of an overall construction project. For example, purchase orders issued and fulfilled during fabrication processes can provide historically valuable data for auditing and reporting purposes.

The job work order number and fabrication cost line item(s) and fabrication labor costs line item(s) defines control numbers that can be associated with the cost of a fabrication process and the labor costs associated therewith. The control numbers can be linked to inventory materials costs, purchase orders, time entry data, and payroll data. The control numbers can be used by the network services 16, ERP system 38, and the fabrication/distribution system to enable and facilitate reporting, auditing, and accounting for a construction project. The control number can have an impact on a fabrication process in real-time or provide historical data that can be used to better understand overall operations and the trending of fabrication systems. For example, fabrication costs associated with a project can be monitored in real-time and if pre-defined cost structures are exceeded, reports can be generated and sent to the appropriate people. In addition, the materials and labor costs can be evaluated over a historical time frame to better understand cost structures associated with a fabrication system.

The job work order number and distribution cost line item(s) and distribution labor costs line item(s) define at least one control number that can be associated with the cost of a packaging and shipping costs as well as the labor costs associated therewith. The control numbers can be linked to packing materials costs, vehicle fleet costs, time entry data, and payroll data. The control numbers can be used by the network services 16, ERP system 38, and the fabrication/distribution system to enable and facilitate reporting, auditing, and accounting for a construction project. The control number can have an impact on the distribution systems in real-time or provide historical data that can be used to better understand overall operations and the trending of the distribution systems. For example, distribution costs associated with a project can be monitored in real-time and if pre-defined cost structures are exceeded, reports can be generated and sent to the appropriate people. In addition, the shipping and labor costs can be evaluated over a historical time frame to better understand cost structures associated with a distribution system.

The job work order number and fabrication system line item(s) and the fabrication system demand/capacity line item defines control numbers that can be associated with a fabrication system and the capacity and current demand of the system. The job number and distribution system and distribution system demand and capacity line items defines control number than can be associated with a distribution system and a distribution demand and capacity. The line items provide a system identifier, a capacity value of the system, and a current demand value on the system. The values can be used to better determine how to distribute load of a project among fabrication and distribution systems.

The job work order number and production metrics line item define at least one control number associated with a production metric. Each production metric can define the amount of product being fabricated for the associated job for a specified period of time and the utilization percentage of the total output capacity of a fabrication system or systems. The job work order number and queue identification line item can be associated with a value that identifies where a product is in the fabrication or distribution process. The job work order number and auxiliary data line item defines at least one control number that can be associated with data items for miscellaneous information.

An important component of the data structure 400 and the associated algorithms as discussed in reference to FIGS. 6-14 is that it can integrate data from various entities and can be managed and controlled in a manner so that the fabrication and distribution processes can be done cheaper, with less resources, and in less time. In other words, the systems and methods described herein provides a more granular view of the fabrication and distribution process and finer control.

Figure 17A:
Figure 24:

Referring now to FIG. 16-26, illustrated are various User Interfaces (UI) for displaying, accessing, and controlling data structure 500. The UI's provide functional UI features that allow access to the data structure 400 for viewing and manipulating the data structure 400 for auditing, accounting, reporting purposes as well as controlling the fabrication and distribution process. In reference to FIG. 16, a job number or control number can be entered to retrieve associated work orders. As can be seen in FIG. 17, searching for a specific job number results in a set of control numbers associated with different work order number being returned. The control numbers can be filtered and further manipulated. Selection of a control number can result in the generation and display of line items associated with a job number, see FIG. 18. As can be seen in FIG. 18-26, the line item data, as previously discussed, provided is an extensive view into the fabrication and distribution processes that can be quite useful in managing, controlling, and reporting on construction projects.

Figure 27:
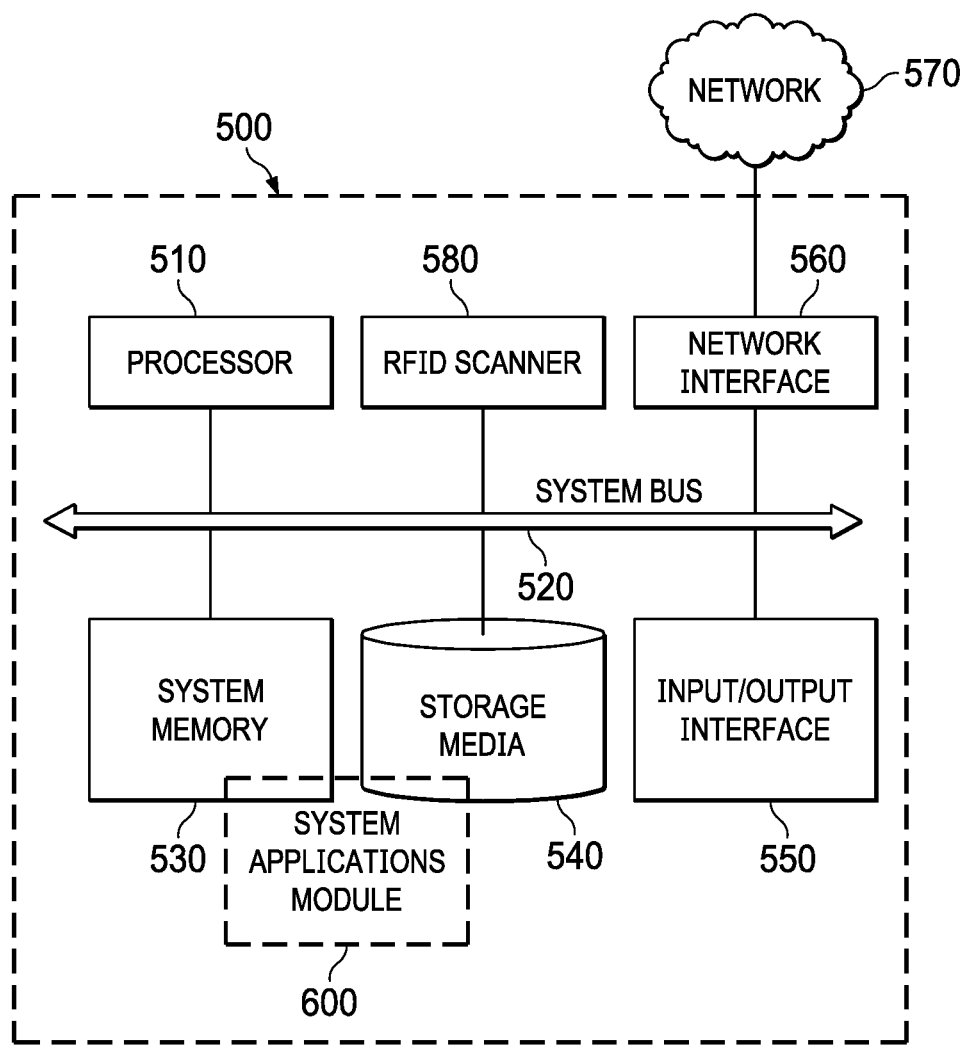
FIG. 27 is a block diagram depicting a computing machine and system applications, in accordance to certain example embodiments.

Referring now to FIG. 27, illustrated is a computing machine 500 and a system applications module 600 in accordance with example embodiments. The computing machine 500 can correspond to any of the various computers, mobile devices, laptop computers, servers, embedded systems, or computing systems presented herein. The module 600 can comprise one or more hardware or software elements designed to facilitate the computing machine 500 in performing the various methods and processing functions presented herein. The computing machine 500 can include various internal or attached components such as a processor 510, system bus 520, system memory 530, storage media 540, input/output interface 550, and a network interface 560 for communicating with a network 570, and an RFID scanner 580.

The computing machine 500 can be implemented as a conventional computer system, an embedded controller, a laptop, a server, a mobile device, a smartphone, a wearable computer, a customized machine, any other hardware platform, cloud computing, cloud services, SaaS models, or any combination or multiplicity thereof. The computing machine 500 can be a distributed system configured to function using multiple computing machines interconnected via a data network or bus system.

The processor 510 can be designed to execute code instructions in order to perform the operations and functionality described herein, manage request flow and address mappings, and to perform calculations and generate commands. The processor 410 can be configured to monitor and control the operation of the components in the computing machine 500. The processor 510 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 510 can be a single processing unit, multiple processing units, a single processing core, multiple processing cores, special purpose processing cores, co-processors, or any combination thereof. According to certain embodiments, the processor 510 along with other components of the computing machine 500 can be a virtualized computing machine executing within one or more other computing machines.

The system memory 520 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 520 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 520. The system memory 530 can be implemented using a single memory module or multiple memory modules. While the system memory 530 is depicted as being part of the computing machine 500, one skilled in the art will recognize that the system memory 530 can be separate from the computing machine 500 without departing from the scope of the subject technology. It should also be appreciated that the system memory 530 can include, or operate in conjunction with, a non-volatile storage device such as the storage media 540.

The storage media 540 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 540 can store one or more operating systems, application programs and program modules such as module 500, data, or any other information. The storage media 540 can be part of, or connected to, the computing machine 500. The storage media 540 can also be part of one or more other computing machines that are in communication with the computing machine 500 such as servers, database servers, cloud storage, network attached storage, and so forth.

The system applications module 600 can comprise one or more hardware or software elements configured to facilitate the computing machine 500 with performing the various methods and processing functions presented herein. The module 600 can include one or more sequences of instructions stored as software or firmware in association with the system memory 530, the storage media 540, or both. The storage media 540 can therefore represent examples of machine or computer readable media on which instructions or code can be stored for execution by the processor 510. Machine or computer readable media can generally refer to any medium or media used to provide instructions to the processor 510. Such machine or computer readable media associated with the module 600 can comprise a computer software product. It should be appreciated that a computer software product comprising the module 600 can also be associated with one or more processes or methods for delivering the module 600 to the computing machine 500 via the network 570, any signal-bearing medium, or any other communication or delivery technology. The module 600 can also comprise hardware circuits or information for configuring hardware circuits such as microcode or configuration information for an FPGA or other PLD. In one exemplary embodiment, module 600 can include BRANDT work flow order processing module that implements work flow processing algorithms for communication processing, integration, and automation of workflow data with systems and processes presented herein.

The input/output ("I/O") interface 550 can be configured to couple to one or more external devices, to receive data from the one or more external devices, and to send data to the one or more external devices. Such external devices along with the various internal devices can also be known as peripheral devices. The I/O interface 550 can include both electrical and physical connections for coupling the various peripheral devices to the computing machine 500 or the processor 510. The I/O interface 550 can be configured to communicate data, addresses, and control signals between the peripheral devices, the computing machine 500, or the processor 510. The I/O interface 550 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 550 can be configured to implement only one interface or bus technology. Alternatively, the I/O interface 550 can be configured to implement multiple interfaces or bus technologies. The I/O interface 550 can be configured as part of, all of, or to operate in conjunction with, the system bus 520. The I/O interface 550 can include one or more buffers for buffering transmissions between one or more external devices, internal devices, the computing machine 500, or the processor 510.

The I/O interface 550 can couple the computing machine 500 to various input devices including mice, touch-screens, scanners, electronic digitizers, sensors, receivers, touchpads, trackballs, cameras, microphones, keyboards, any other pointing devices, or any combinations thereof. The I/O interface 550 can couple the computing machine 500 to various output devices including video displays, speakers, printers, projectors, tactile feedback devices, automation control, robotic components, actuators, motors, fans, solenoids, valves, pumps, transmitters, signal emitters, lights, and so forth.

The computing machine 500 can operate in a networked environment using logical connections through the network interface 560 to one or more other systems or computing machines across the network 570. The network 570 can include wide area networks (WAN), local area networks (LAN), intranets, the Internet, wireless access networks, wired networks, mobile networks, telephone networks, optical networks, or combinations thereof. The network 570 can be packet switched, circuit switched, of any topology, and can use any communication protocol. Communication links within the network 570 can involve various digital or an analog communication media such as fiber optic cables, free-space optics, waveguides, electrical conductors, wireless links, antennas, radio-frequency communications, and so forth.

The processor 510 can be connected to the other elements of the computing machine 500 or the various peripherals discussed herein through the system bus 520. It should be appreciated that the system bus 520 can be within the processor 510, outside the processor 510, or both. According to some embodiments, any of the processor 510, the other elements of the computing machine 500, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A fabrication and distribution system integrated with an order workflow system for managing workflow order data, comprising:

a storage resource; and a processor communicatively coupled to the storage resource, wherein the processor is configured to execute application code instructions stored in the storage resource to cause the system to:

standardize a plurality of data records to unify two or more of each of a plurality of predetermined order workflow application database fields, predetermined building information management (BIM) application database fields and predetermined enterprise resource planning (ERP) application database fields;

receive a selection of a job number, work order number, and a delivery date at an order workflow system using the standardized data records;

generate selectable line items for a BIM interface module based on the work order number;

process selected line items associated with the work order type and generate, in response, an order workflow, at an order queue process using the standardized data records;

interface with a BIM database to identify the selected line items, at a spooling sub-queue process to determine if the order is approved for release or requires approval, and to submit the selected line items that require approval to an associated approval queue for drawing creation;

and generate, in response, a control number for each line item; and interface information associated with selected line items with an ERP module.

2. The system of claim 1 wherein the application code to cause the system to interface information with the ERP module further comprises application code instructions to cause the system to:

generate inventory data items from the selectable line items, at the spooling sub-process queue; and interface the inventory data items associated with the line items with an inventory application protocol interface of the ERP module.

3. The system of claim 1 wherein the processor executes application code instructions to cause the system to determine a fabrication facility system according to work order number, at a routing sub-process queue.

4. The system of claim 3 wherein the application code to cause the system to interface information with the ERP module further comprises application code instructions to cause the system to:

generate purchasing data items from the selectable line items, at the routing sub-process queue; and interface purchasing information associated with line items with a purchasing application protocol interface of the ERP module.

5. The system of claim 3 wherein the application code instructions to cause the system to process at the fabrication facility system the order workflow further comprises application code instructions to cause the system to:

create a schedule for the order workflow based on the delivery date, at a scheduling sub-process queue;

determine at least one address associated with a fabrication unit according to the job number; and route the order workflow to the address.

6. The system of claim 5 further comprising application code instructions to cause the system to:

receive at least one beginning time entry and an ending time entry for work spent on a fabrication process, at the fabrication sub-process queue;

estimate cost of the fabrication process associated with the order workflow, based at least in part on amount of time spent on the fabrication process; and interface the estimated cost of the fabrication process to a job cost application protocol interface of the ERP module.

7. The system of claim 1 wherein the processor executes application code instructions to cause the system to:
generate a status report of an order workflow;
determine a plurality of recipient email addresses based on job number; and
route the status report to the plurality of recipients.

8. The system of claim 1 wherein the application code instructions to cause the system to interface line items with a BIM database further includes application code instructions to cause the system to:
store line item data; and
retrieve at least one of updated line item data and additional line item data.

9. A method of integrating an order workflow system with a fabrication and distribution system for managing workflow order data, the method comprising:
standardizing a plurality of data records to unify two or more of each of a plurality of predetermined order workflow application database fields, predetermined building information management (BIM) application database fields and predetermined enterprise resource planning (ERP) application database fields;
receiving a selection of a job number, work order number, and a delivery date at an order workflow system using the standardized data records;
generating selectable line items for a BIM interface module based on the work order number;
processing selected line items associated with the work order type and generate, in response, an order workflow, at an order queue process using the standardized data records;
interfacing with a BIM database to identify the selected line items, at a spooling sub-queue process and generate, in response, a control number for each line item to determine if the order is approved for release or requires approval, and to submit the selected line items that require approval to an associated approval queue for drawing creation; and
interfacing information associated with selected line items with an ERP module.

10. The method of claim 9 further comprising:
generating inventory data items from the selectable line items, at the spooling sub-process queue; and
interfacing the inventory data items associated with the line items with an inventory application protocol interface of the ERP module.

11. The method of claim 9 further comprising determining a fabrication facility system according to work order type, at a routing sub-process queue.

12. The method of claim 11 further comprising:
generating purchasing data items from the selectable line items, at the routing sub-process queue; and
interfacing purchasing information associated with line items with a purchasing application protocol interface of the ERP module.

13. The method of claim 11 further comprising:
creating a schedule for the order workflow based on the delivery date, at a scheduling sub-process queue;
determining at least one address associated with a fabrication unit according to the job number; and
routing the order workflow to the address.

14. The method of claim 13 further comprising:
receiving at least one beginning time entry and an ending time entry for work spent on a fabrication process, at the fabrication sub-process queue;
estimating cost of the fabrication process associated with the order workflow based at least in part on amount of time spent on a fabrication process; and
interfacing the estimated cost of the fabrication process to a job cost application protocol interface of the ERP module.

15. A non-transitory computer readable medium containing computer readable instructions for instructing a computing machine to manage workflow order data integrated with a fabrication and distribution system, the computer-readable instructions comprising instructions for causing the computing machine to:
standardize a plurality of data records to unify two or more of each of a plurality of predetermined order workflow application database fields, predetermined building information management (BIM) database application fields and predetermined enterprise resource planning application (ERP) database fields;
receive a selection of a job number, work order number, and a delivery date at an order workflow system using the standardized data records;
generate selectable line items for a BIM interface module based on the work order number;
process selected line items associated with the work order type and generate, in response, an order workflow, at an order queue process using the standardized data records;
interface with a BIM database to identify the selected line items, at a spooling sub-queue process and generate, in response, a control number for each line item to determine if the order is approved for release or requires approval, and to submit the selected line items that require approval to an associated approval queue for drawing creation; and
interface information associated with selected line items with an ERP module.

16. The non-transitory computer readable medium of claim 15 further includes computer readable instruction to cause the computing machine to:
generate inventory data items from the selectable line items, at the spooling sub-process queue; and
interface the inventory data items associated with the line items with an inventory application protocol interface of the ERP module.

17. The non-transitory computer readable medium of claim 15 further includes computer readable instruction to cause the computing machine to determine a fabrication facility system according to work order type, at a routing sub-process queue.

18. The non-transitory computer readable medium of claim 17 further includes computer readable instruction to cause the computing machine to:
generate purchasing data items from the selectable line items, at the routing sub-process queue; and
interface purchasing information associated with line items with a purchasing application protocol interface of the ERP module.

19. The non-transitory computer readable medium of claim 17 further includes computer readable instruction to cause the computing machine to:
create a schedule for the order workflow based on the delivery date, at a scheduling sub-process queue;

determine at least one address associated with a fabrication unit according to the job number; and
route the order workflow to the address.

20. The non-transitory computer readable medium of claim 19 further includes computer readable instruction to cause the computing machine to:
receive at least one beginning time entry and an ending time entry for work spent on a fabrication process, at the fabrication sub-process queue;
estimate cost of the fabrication process associated with the order workflow based at least in part on amount of time spent on the fabrication process; and
interface the estimated cost of the fabrication process to a job cost application protocol interface of the ERP module.

\* \* \* \* \*